United States Patent
Mizutani et al.

(10) Patent No.: US 8,724,187 B2
(45) Date of Patent: May 13, 2014

(54) COLLIMATOR LENS, OPTICAL SCANNING DEVICE AND IMAGE FORMING APPARATUS USING SAME

(71) Applicant: KYOCERA Document Solutions Inc., Osaka (JP)

(72) Inventors: Hideji Mizutani, Osaka (JP); Issei Nakano, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/772,371

(22) Filed: Feb. 21, 2013

(65) Prior Publication Data

US 2013/0215478 A1      Aug. 22, 2013

(30) Foreign Application Priority Data

Feb. 22, 2012   (JP) .................... 2012-036355

(51) Int. Cl.
*H04N 1/04*           (2006.01)

(52) U.S. Cl.
USPC ........... 358/474; 358/475; 358/509; 359/565; 359/569

(58) Field of Classification Search
CPC ............ G02B 5/18; G02B 3/08; G02B 26/08; G11B 7/1374; G11B 2007/13727; G11B 7/00
USPC .......... 358/474, 501, 475, 509, 484; 359/565, 359/572, 569, 570, 207
See application file for complete search history.

(56) References Cited

U.S. PATENT DOCUMENTS

| | | | |
|---|---|---|---|
| 6,262,844 B1 | 7/2001 | Soskind | |
| 8,619,341 B2 * | 12/2013 | Ding et al. | 358/474 |
| 8,619,378 B2 * | 12/2013 | Gutierrez | 359/822 |
| 8,630,025 B2 * | 1/2014 | Hayakawa et al. | 358/474 |
| 2006/0092492 A1 | 5/2006 | Ishibe | |
| 2006/0092816 A1 * | 5/2006 | Kimura | 369/112.08 |

FOREIGN PATENT DOCUMENTS

JP      2004-126192      4/2004

* cited by examiner

*Primary Examiner* — Negussie Worku
(74) *Attorney, Agent, or Firm* — Gerald E. Hespos; Michael J. Porco; Matthew T. Hespos

(57) ABSTRACT

In a collimator lens, in a case where divergent light emitted from a position P1 at a distance S1 from a second face enters the second face and imaging is performed at a position P2 at a distance S2 from a first face, in a temperature range of 0° C. to 60° C. and in a range of the emission wavelength of the light source which changes within the temperature range, and when a minimum value of a wavefront aberration of an image, which is generated at the position P2 by the divergent light emitted from the position P1 in a range of $0<S1/S2\leq 50$, is WF1, and when a minimum value of a wavefront aberration of an image, which is generated at the position P2 when parallel light satisfying $S1=\infty$ enters the second face, is WF2, a relationship of WF1<WF2 is satisfied.

8 Claims, 20 Drawing Sheets

<COMPARATIVE EXAMPLE> PARALLEL LIGHT IRRADIATION/AMBIENT TEMPERATURE 20°C

<COMPARATIVE EXAMPLE> PARALLEL LIGHT IRRADIATION/AMBIENT TEMPERATURE 60°C

<EXAMPLE 1> DIVERGENT LIGHT IRRADIATION/AMBIENT TEMPERATURE 60°C

<COMPARATIVE EXAMPLE> DIVERGENT LIGHT IRRADIATION/AMBIENT TEMPERATURE 20°C

<COMPARATIVE EXAMPLE>
SPOT DIAGRAM OF FOCAL POINT AND WAVEFRONT ABERRATION/AMBIENT TEMPERATURE 20°C

COLLIMATOR LENS, OPTICAL SCANNING DEVICE AND IMAGE FORMING APPARATUS USING SAME

This application relates to and claims priority from Japanese Patent Application No. 2012-36355, filed in the Japan Patent Office on Feb. 22, 2012, the entire disclosure of which is incorporated herein by reference.

BACKGROUND

The present disclosure relates to a collimator lens having a temperature compensating function, an optical scanning device which uses the foregoing collimator lens, and an image forming apparatus which uses the foregoing optical scanning device.

For example, a general optical scanning device that is used in laser printers, copiers and the like includes optical components including a light source which emits a laser beam, a polygon mirror which reflects and deflects/scans the laser beam, an incident optical system which causes the laser beam to enter the polygon mirror, and a scanning lens which images the deflected/scanned laser beam on a peripheral face (surface to be scanned) of a photoreceptor drum. The incident optical system includes a collimator lens which converts the diverging laser beam into parallel light or convergent light, and a cylindrical lens which converts the parallel light or the convergent light into linear light and images the linear light on a reflecting surface of the polygon mirror. These optical components are generally housed in a resin housing for dust prevention.

Meanwhile, when the temperature of the environment that the optical scanning device is disposed changes, the optical performance of the optical components is affected. In particular, when lens components made from a resin material are used, the influence is significant. When the ambient temperature changes, for example, variation in the refractive index of the lens component, variation in the emission wavelength based on the temperature characteristics of the laser diode which emits the laser beam, change in the lens shape caused by thermal deformation and so on will occur. Moreover, due to the thermal deformation of the housing, the distance to the photoreceptor drum or the distance between the optical components will change. Particularly, since a collimator lens has high error sensitivity, if it is molded from a resin material in which the refractive index changes easily due to the temperature, the imaging position tends to change as a result of the temperature change. Accordingly, it is necessary to provide some kind of temperature compensating function.

Known is technology where, as a result of adding a diffractive-optical element to one face of the collimator lens, change in power associated with the variation in the refractive index induced by the change in the ambient temperature, and variation in the imaging position caused by the mode hopping of the laser diode can be compensated. In order to achieve this fluctuation compensation, various parameters such as the focal distance of the scanning lens and spot diameter of the main scanning cross section are defined with a relational expression.

Nevertheless, there are cases where the imaging performance cannot be sufficiently compensated merely by compensating the fluctuation of the imaging position. In other words, just because the imaging position is adjusted, it does not necessarily mean that the imaging performance such as aberration or the like will also be favorably adjusted. Moreover, it is also necessary to give consideration to measures against the thermal expansion of the housing. Accordingly, even when attempting to configure the housing using relatively inexpensive materials with a large linear expansion coefficient, there was a problem in that, since the imaging performance is insufficient, such inexpensive materials could not be used.

An object of the present disclosure is to provide a collimator lens having a temperature compensating function having superior imaging performance, an optical scanning device which uses the foregoing collimator lens, and an image forming apparatus which uses the foregoing optical scanning device.

SUMMARY

The collimator lens according to one aspect of the present disclosure is a collimator lens which converts, into convergent light, a light beam of divergent light emitted from a light source in which an emission wavelength changes according to temperature, including a first face which faces the light source on a light path and on which the light beam is incident, a second face which is placed opposite to the first face and from which the light beam exits, and a diffractive structure which is formed on at least one of the first face and the second face. In the collimator lens, in a case where divergent light emitted from a position P1 at a distance S1 from the second face enters the second face and imaging is performed at a position P2 at a distance S2 from the first face, in a temperature range of 0° C. to 60° C. and in a range of the emission wavelength of the light source which changes within the temperature range, and when a minimum value of a wavefront aberration of an image, which is generated at the position P2 by the divergent light emitted from the position P1 in a range of $0<S1/S2 \leq 50$, is WF1, and when a minimum value of a wavefront aberration of an image, which is generated at the position P2 when parallel light satisfying $S1=\infty$ enters the second face, is WF2, a relationship of WF1<WF2 is satisfied.

The optical scanning device according to another aspect of the present disclosure includes a light source, a collimator lens, a deflector, a cylindrical lens and a scanning lens. The light source emits divergent light and an emission wavelength thereof changes according to temperature. The collimator lens is a lens which converts, into convergent light, a light beam emitted from the light source, and includes the foregoing features. The deflector comprises a reflective surface which reflects the light beam emitted from the light source, and deflects/scans the light beam. The cylindrical lens converts the convergent light into linear light and images the linear light on a reflecting surface of the deflector. The scanning lens images, on a surface to be scanned, the light beam that has been deflected/scanned by the deflector.

The image forming apparatus according to another aspect of the present disclosure includes an image carrier which carries an electrostatic latent image, and irradiates a peripheral face of the image carrier as the surface to be scanned with a light beam.

DETAILED DESCRIPTION

Figure 1:
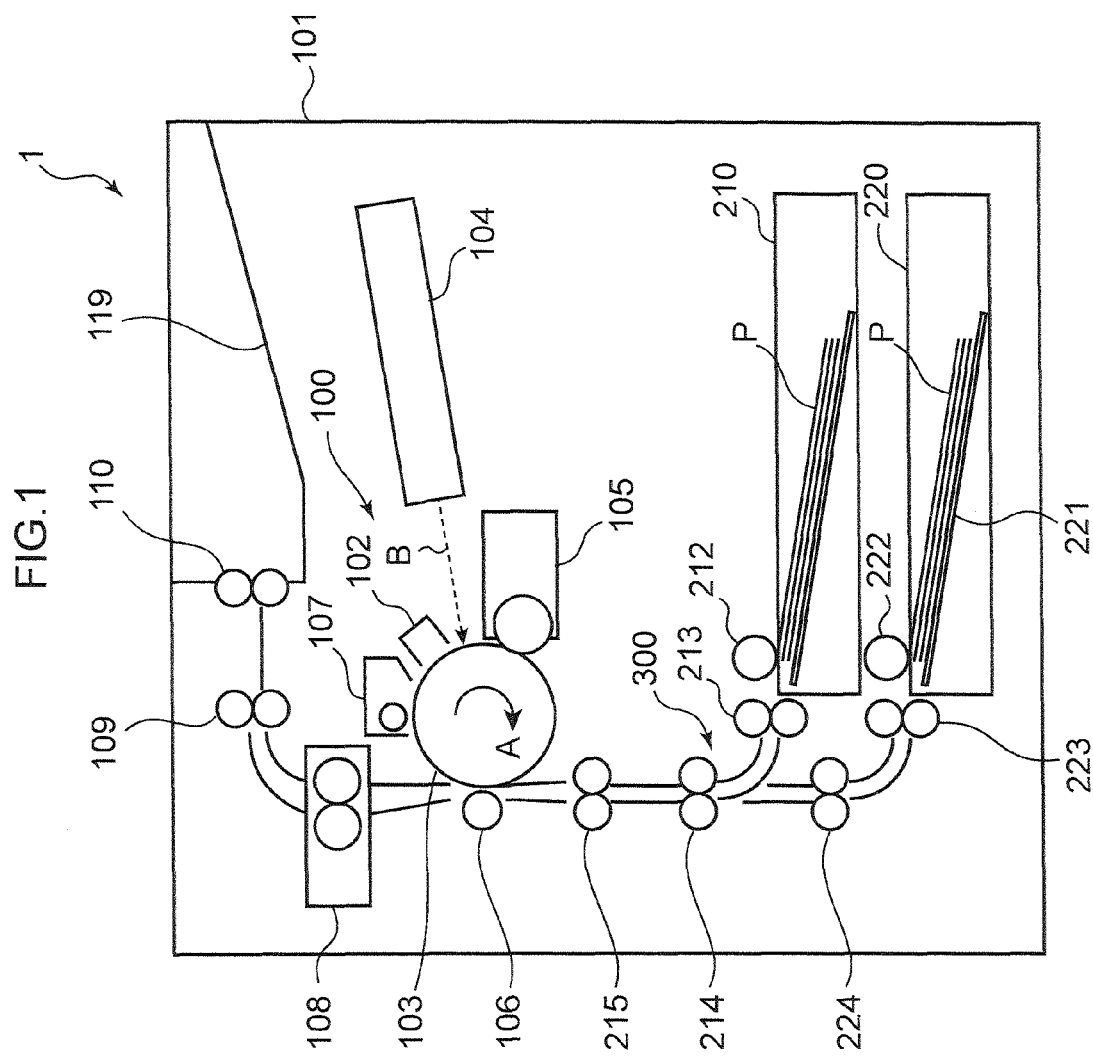
FIG. 1 is a cross section showing the schematic configuration of the printer according to one embodiment of the present disclosure.

The optical scanning device according to one embodiment of the present disclosure is now explained with reference to the appended drawings. FIG. 1 is a cross section showing the schematic configuration of a printer 1 (example of an image forming apparatus) according to one embodiment of the present disclosure. Note that the image forming apparatus is not limited to the printer 1, and may also be a copier, a facsimile, a multi-function machine or the like. The printer 1 includes a box-shaped housing 101, and an image forming unit 100, an optical scanning device 104, and paper feeding cassettes 210, 220 housed in the housing 101. The paper feeding cassettes 210, 220 are detachably mounted on a bottom part of the printer 1.

The image forming unit 100 performs processing of forming a toner image on a sheet, and includes a charging device 102, a photoreceptor drum 103 (image carrier), a developing device 105, a transfer roller 106, a cleaning device 107, and a fixing unit 108.

The photoreceptor drum 103 is a cylindrical member, and an electrostatic latent image and a toner image are formed on a peripheral face thereof. The photoreceptor drum 103 receives drive force from a motor not shown, and is rotated in a clockwise direction shown with an arrow A in FIG. 1. The charging device 102 substantially uniformly charges the surface of the photoreceptor drum 103.

The developing device 105 supplies a toner to the peripheral surface of the photoreceptor drum 103, on which an electrostatic latent image was formed, and thereby forms a toner image. The developing device 105 includes a developing roller for carrying the toner, and a screw for agitating and delivering the toner. The toner image formed on the photoreceptor drum 103 is transferred to a sheet that is fed from the paper feeding cassettes 210, 220 and delivered to a feeding path 300. The toner is supplied to the developing device 105 from a toner container not shown.

The transfer roller 106 is disposed facing a lateral side of the photoreceptor drum 103, and a transfer nip portion is formed by the transfer roller 106 and the photoreceptor drum 103. The transfer roller 106 is configured from a rubber material with conductivity and provided with a transfer bias, and transfers the toner image formed on the photoreceptor drum 103 to the sheet. The cleaning device 107 cleans the peripheral surface of the photoreceptor drum 103 after the toner image is transferred.

The fixing unit 108 includes a fixing roller with a heater build therein, and a pressure roller provided at a position facing the fixing roller. The fixing unit 108 fixes the toner image, which was transferred to a sheet, on the sheet while conveying and heating the sheet with the toner image formed thereon with the rollers.

The optical scanning device 104 forms an electrostatic latent image by irradiating a laser beam according to image data that is input from external equipment such as a personal computer to the peripheral surface (surface to be scanned) of the photoreceptor drum 103 that was substantially uniformly charged by the charging device 102. The optical scanning device 104 will be described in detail later.

The paper feeding cassettes 210, 220 house a plurality of sheets P to which images are to be formed. A feeding path 300 for delivering the sheets is disposed between the paper feeding cassettes 210, 220 and the image forming unit 100. The feeding path 300 is provided with paper feed roller pairs 213, 223, transport roller pairs 214, 224, and a resist roller pair 215. Moreover, disposed on the downstream side of the fixing unit 108 are a transport roller pair 109, and a discharge roller pair 110 for discharging the sheets to the paper discharge tray 119.

The image forming operation of the printer 1 is now briefly explained. Foremost, the peripheral surface of the photoreceptor drum 103 is substantially uniformly charged with the charging device 102. The charged peripheral surface of the photoreceptor drum 103 is exposed by a laser beam emitted from the optical scanning device 104, and an electrostatic latent image of the image to be formed on the sheet P is formed on the peripheral surface of the photoreceptor drum 103. The electrostatic latent image is developed as a toner image as a result of the toner being supplied from the developing device 105 to the peripheral surface of the photoreceptor drum 103. Meanwhile, the sheet P is fed from the paper feeding cassettes 210, 220 to the feeding path 300 by the pickup rollers 212, 222, and delivered to the transport roller pairs 214, 224. Subsequently, the sheet P is once stopped by the resist roller pair 215, and delivered to the transfer nip portion between the transfer roller 106 and the photoreceptor drum 103 at a predetermined timing. The toner image is transferred to the sheet P as a result of the sheet P passing through the transfer nip portion. After the foregoing transfer operation, the sheet P is delivered to the fixing unit 108, and the toner image is fixed to the sheet P. Subsequently, the sheet P is discharged to the paper discharge tray 119 by the transport roller pair 109 and the discharge roller pair 110.

<First Embodiment of Optical Scanning Device>

Figure 2:
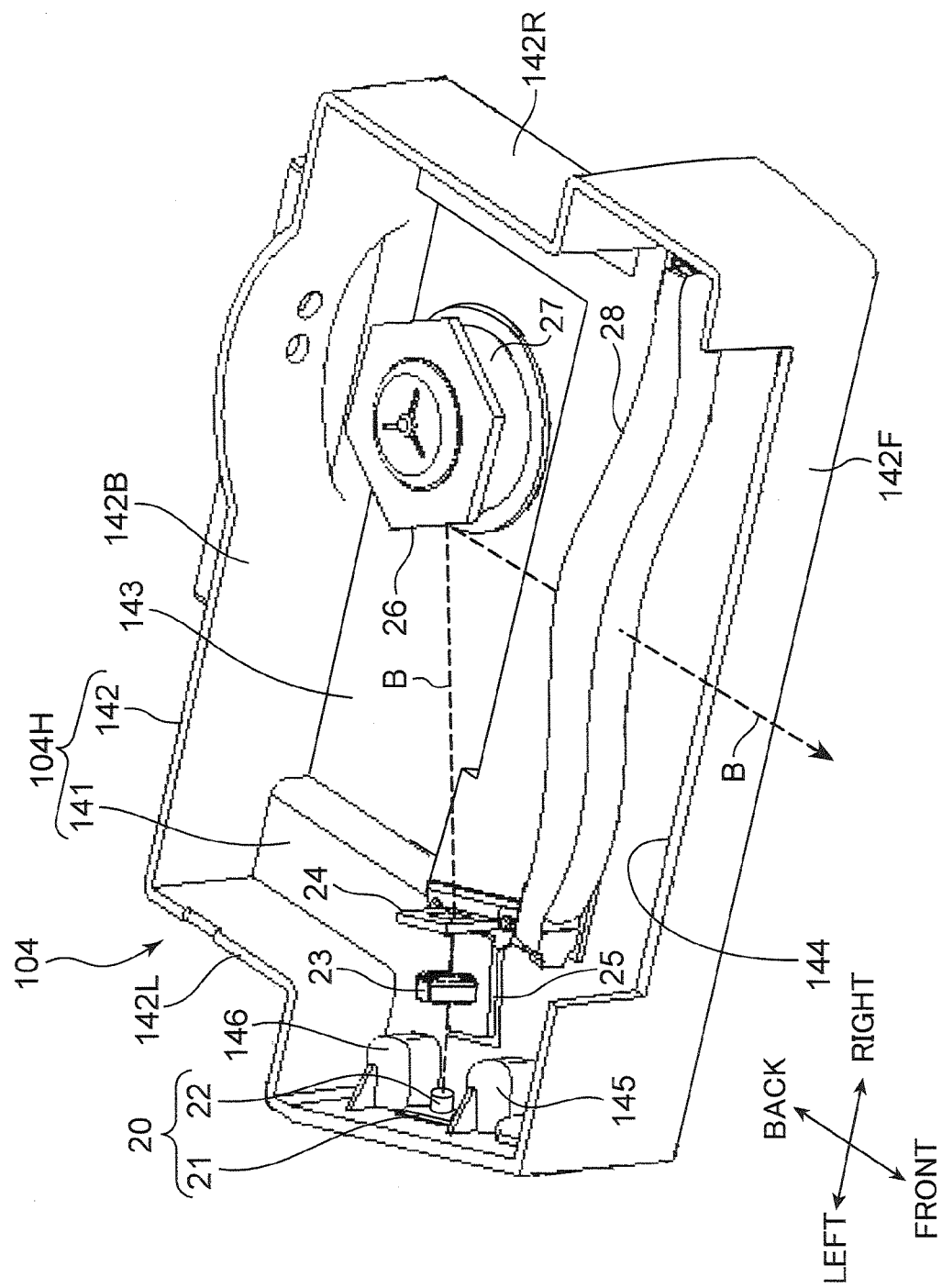
FIG. 2 is a perspective view showing the internal structure of the optical scanning device to be mounted on the foregoing printer.
Figure 3:
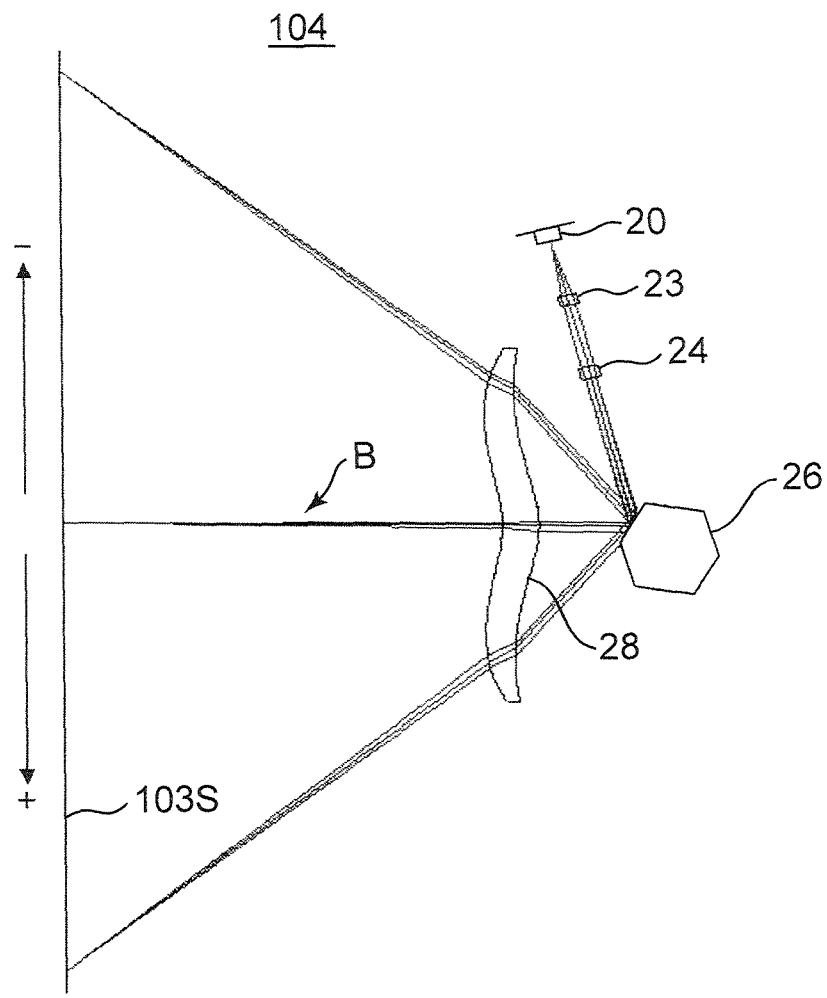
FIG. 3 is a light path diagram showing the configuration of the optical scanning device of embodiment 1 in the main scanning cross section.

The detailed structure of the optical scanning device 104 according to the first embodiment is now explained. FIG. 2 is a perspective view showing the internal structure of the optical scanning device 104, and FIG. 3 is a light path diagram showing the configuration of the optical scanning device 104 in the main scanning cross section. The optical scanning device 104 includes a housing 104H, and a laser unit 20 (light source), a collimator lens 23, a cylindrical lens 24, a polygon mirror 26 (deflector), and a fθ lens 28 (scanning lens) housed in the housing 104H. In the indication of directions shown in FIG. 2, the left-right direction is the main scanning direction. The optical scanning device 104 of this embodiment is an optical scanning device in which the scanning lens is configured from only one lens (fθ lens 28).

The housing 104H includes a bottom plate 141 as a base member on which various members are mounted, side plates 142 that are erected substantially vertically from the peripheral edges of the bottom plate 141, and a cover for covering the upside of the side plates 142. Note that, in FIG. 2, since a state where the cover has been removed is shown, the cover is not indicated. The housing 104H has a substantially square shape when viewed from the top face. The side plates 142 include a front side plate 142F which faces a peripheral surface 103S of the photoreceptor drum 103 when the optical scanning device 104 is mounted on the printer 1, a rear side plate 142B which faces the front side plate 142F, and a right side plate 142R and a left side plate 142L which connect both sides of the front side plate 142F and the rear side plate 142B.

The bottom plate 141 is provided with a recess 143 at a location which is adjacent to the rear side plate 142B and which has a height that is lower than its surroundings. A polygon mirror 26 is disposed in the recess 143, and the laser unit 20, the collimator lens 23, the cylindrical lens 24 and the fθ lens 28 are disposed in a region other than the recess 143 of the bottom plate 141. The front side plate 142F is provided with a window part 144 which is formed by notching the front side plate 142F from the upper edge up to around the intermediate portion thereof. Even in a state where the cover (not shown) is mounted, the window part 144 remains an opening of the housing 104H. Moreover, a first holding member 145 and a second holding member 146 are provided on a top face of the bottom plate 141 near the left side plate 142L. A minute gap is provided between the left side plate 142L and the first holding member 145, and between the left side plate 142L and the second holding member 146, respectively. Note that the housing 104H is molded from thermally expandable resin.

The laser unit 20 includes a substrate 21, a substantially cylindrically shaped semiconductor laser 22 mounted on one face of the substrate 21, and a cover glass 20G (refer to FIG. 5, FIG. 6) disposed in front of the light-emitting face. The semiconductor laser 22 is a light source which emits a laser beam (light beam) of a predetermined wavelength. The laser beam is divergent light, and its wavelength changes based on the fluctuation in the ambient temperature. Specifically, the laser beam has temperature characteristics in which the emission wavelength becomes longer as the temperature rises.

Mounted on the substrate 21 are a semiconductor laser 22, and a drive circuit component for driving the semiconductor laser 22. The laser unit 20 is mounted on the top face of the bottom plate 141 such that the substrate 21 is sandwiched in the gap formed between the first holding member 145 and the left side plate 142L and the gap formed between the second holding member 146 and the left side plate 142L respectively, and such that the semiconductor laser 22 is fitted between the first holding member 145 and the second holding member 146. The irradiation position of the laser beam B can be adjusted by adjusting the position at which the substrate 21 is fitted into the gap.

The collimator lens 23 is molded from a resin material, and converts the laser beam B, which is emitted from the semiconductor laser 22 and diffused, into convergent light. As a result of the collimator lens 23 having optical power for generating convergent light, it is possible to shorten the light path length, and consequently miniaturize the optical scanning device 104. The collimator lens 23 is fixed to the bottom plate 141 with an adhesive using a base part 25. As described in detail later, the collimator lens 23 comprises a diffractive structure for performing the temperature compensation of the optical property.

The cylindrical lens 24 converts the convergent light into linear light that is long in a main scanning direction, and images the linear light on a reflecting surface of the polygon mirror 26. The collimator lens 23 and the cylindrical lens 24 are an incident optical system which causes the laser beam B to enter the polygon mirror 26, and in this embodiment is configured from an oblique-incident optical system.

The polygon mirror 26 is a polygonal mirror in which a reflecting surface is formed along each side of a regular hexagon. A rotating axis of the polygon motor 27 is connected to the center position of the polygon mirror 26. The polygon mirror 26 rotates around the rotating axis as a result of being rotatively driven by the polygon motor 27, and deflects and scans the laser beam B which is emitted from the semiconductor laser 22 and imaged via the collimator lens 23 and the cylindrical lens 24.

The fθ lens 28 is a lens having fθ characteristics, and is a lens that is elongated in the main scanning direction. The fθ lens 28 is disposed between the window part 144 and the polygon mirror 26. The laser beam B reflected off the polygon mirror 26 is condensed by the fθ lens 28, and images on the peripheral surface 103S of the photoreceptor drum 103 through the window part 144 of the housing 104H. The fθ lens 28 is manufactured by molding a translucent resin material in a metal mold.

Figure 4:
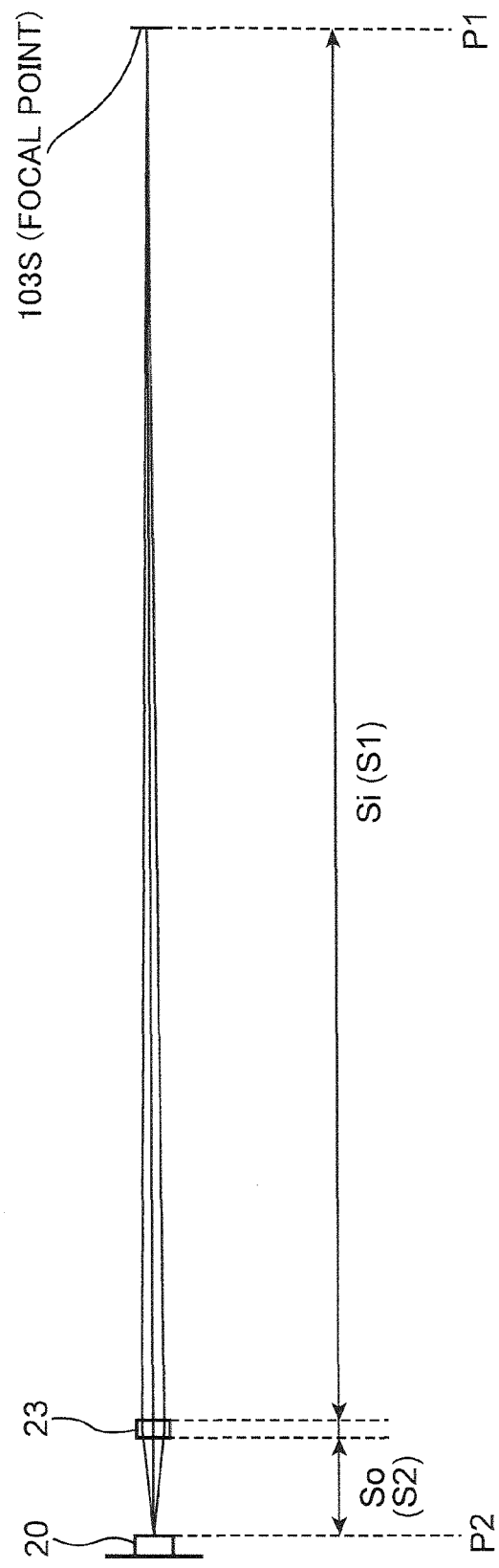
FIG. 4 is a light path diagram showing the convergent light that is formed by a single collimator lens.
Figure 5:
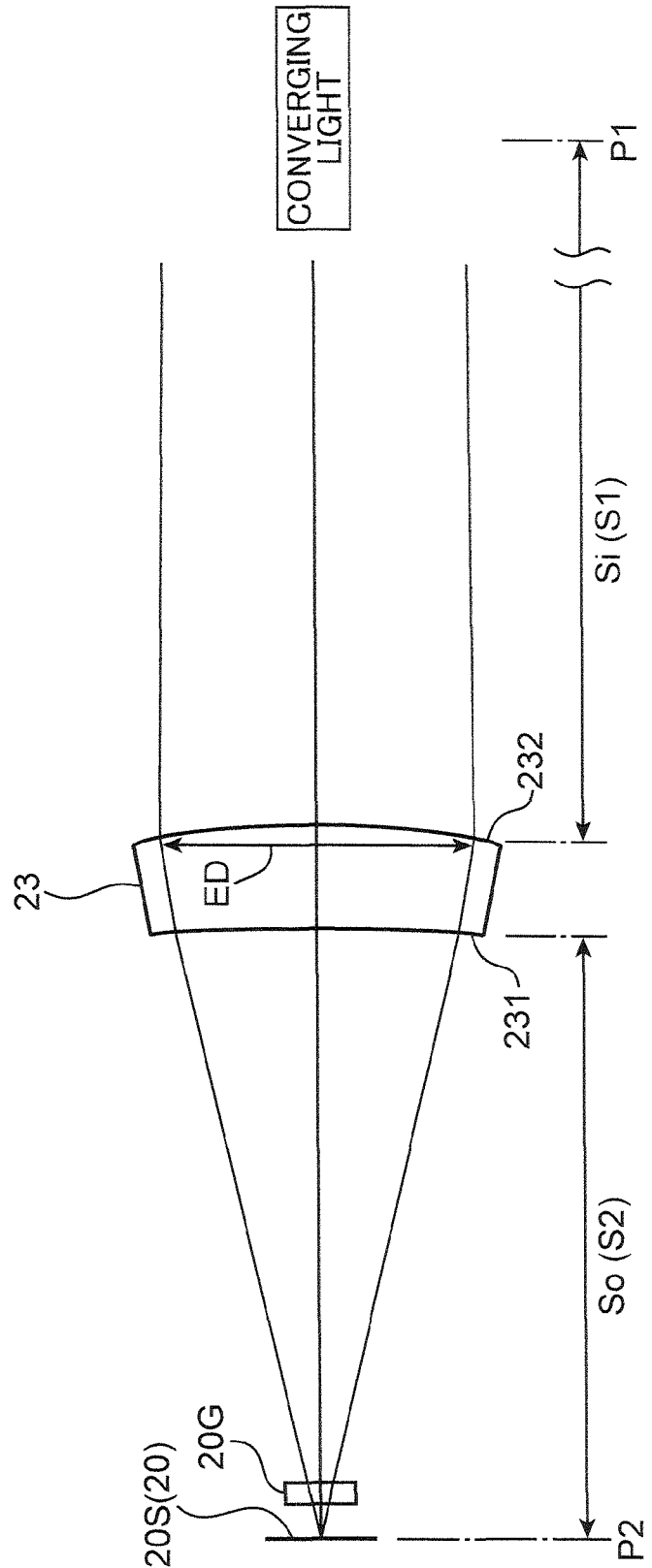
FIG. 5 is a light path diagram showing the relevant part of FIG. 4.

FIG. 4 is a light path diagram showing convergent light that is formed by a single collimator lens 23, and FIG. 5 is a light path diagram showing the relevant part of FIG. 4. Note that, in FIG. 5, the cover glass 20G of the laser unit 20 is shown. The collimator lens 23 includes a first face 231 facing the laser unit 20 on the light path of the laser beam B, and a second face 232 facing the polygon mirror 26 (image side).

As the collimator lens 23 of this embodiment, a collimator lens having the following three features of (A) to (C) is used.

(A) At least one of the first face 231 and the second face 232 includes a diffractive structure for performing the temperature compensation of the optical property.

(B) Based on the foregoing diffractive structure, in a temperature range of 0° C. to 60° C. and in a range of the emission wavelength of the semiconductor laser 22 which changes within the foregoing temperature range, the wavefront aberration of an image generated by the collimator lens 23 when divergent light enters the second face 232 is smaller than the wavefront aberration when parallel light enters the second face 232.

(C) While the focal distance of the collimator lens represented with the function of an emission wavelength λ of the semiconductor laser 22 and a temperature T becomes longer as the ambient temperature becomes higher, a distance Si from the second face 232 to an imaging point (peripheral surface 103S of the photoreceptor drum 103) becomes shorter as the ambient temperature becomes higher.

Referring to FIG. 5, the collimator lens 23 shown as an example is a meniscus lens which is convex on the image side. In other words, the first face 231 is a concave surface having negative optical power, and the second face 232 is a convex surface having positive optical power. As a result of the first face 231 having negative optical power, the aberration relative to the off-axis light beam can be reduced. The first face 231 and the second face 232 are both aspheric surfaces. In addition, a diffractive structure is provided within a range of the effective diameter ED of the second face 232. Note that the diffractive structure may be provided to the first face 231 or provided to both the first face 231 and the second face 232.

The foregoing aspheric surface can be defined with the following Formula (1), and the phase distribution of the diffraction distribution can be defined with the following Formula (2).

[Formula 1]

$$z = \frac{r^2/R}{1+\sqrt{1-(1+k)(r/R)^2}} + \sum_{i=1} C_i r^j \quad (1)$$

$$\phi(r) = \frac{2\pi}{\lambda} \sum_{i=1} D_{2j} r^{2j} \quad (2)$$

provided $$r = \sqrt{x^2+y^2}$$

The collimator lens 23 of this embodiment shapes, into convergent light, a light beam of divergent light emitted from the light-emitting face 20S of the laser unit 20 as the point light source. In other words, the divergent light that is entered the first face 231 of the collimator lens 23 at a distance So from the light-emitting face 20S is imaged at the focal point of a position at a distance Si from the second face 232 (in fact, the peripheral surface 103S becomes the focal point based on the combination with the fθ lens 28). Accordingly, as a result of the collimator lens 23 playing the role of generating convergent light, the scanning optical system can be downsized, and the optical scanning device 104 can be consequently downsized.

Figure 6:
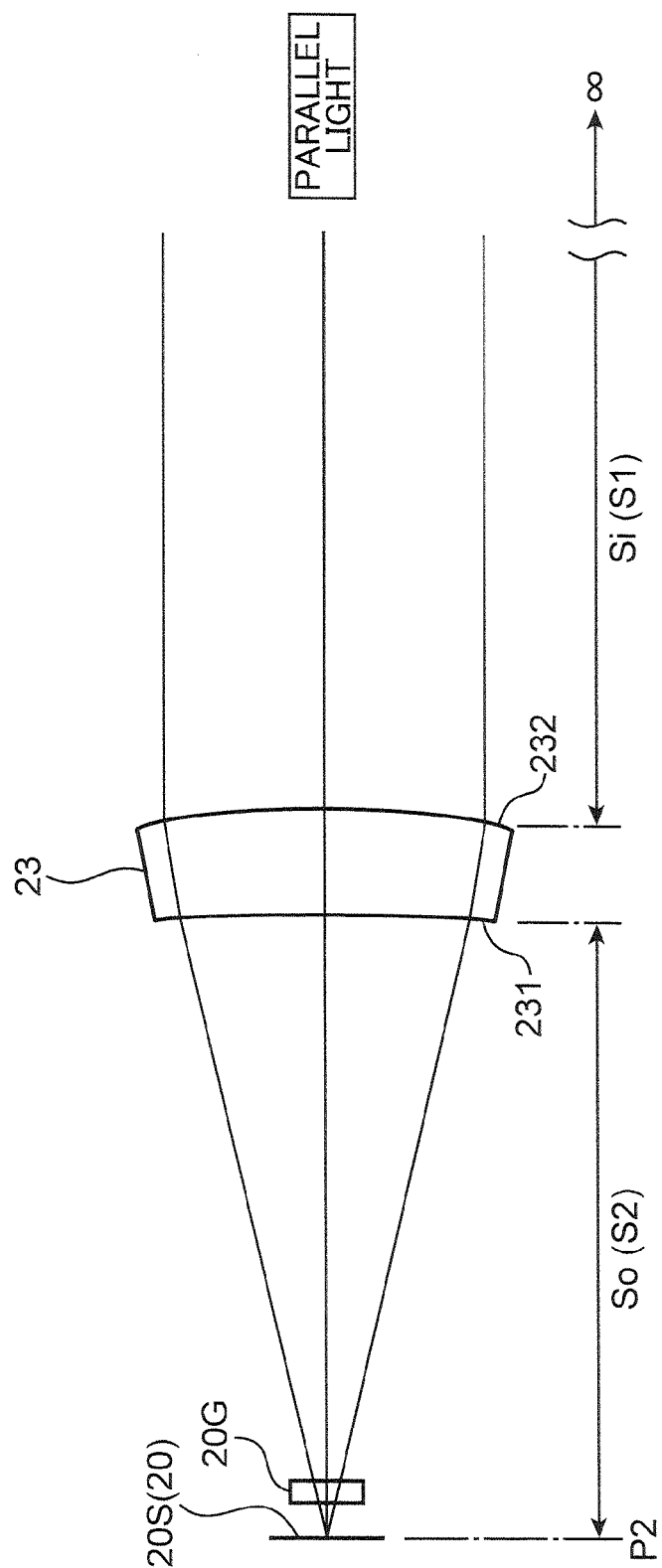
FIG. 6 is a light path diagram showing a case where the parallel light enters the collimator lens.

A general collimator lens 23 is used, as shown in FIG. 6, for shaping the divergent light emitted from the light-emitting face 20S into parallel light. In other words, the distance between the second face 232 and the focal point is a distance Si=∞. Accordingly, the collimator lens 23 is designed such that, when ideal parallel light enters the collimator lens 23 from the side of the second face 232, the wavefront aberration of the image generated at the imaging position P2 (position corresponding to the light-emitting face 20S) that is separated at a distance So from the first face 231 is reduced.

When divergent light, and not parallel light, enters this kind of general collimator lens 23, the imaging performance will deteriorate. In other words, when divergent light emitted from a position at a distance Si from the second face 232 enters the second face 232, the wavefront aberration of the image generated at the imaging position P2 that is separated at a distance So from the first face 231 will deteriorate in comparison to the case when parallel light enters the second face 232. Thus, when attempting to cause the collimator lens 23 to generate convergent light in order to downsize the scanning optical system, there is a problem in that favorable imaging performance cannot be obtained.

The foregoing problem is resolved in this embodiment by disposing a diffractive structure on the second face 232. Here, when the divergent light emitted from the position P1 at a distance S1 (corresponds to foregoing distance Si) from the second face 232 of the collimator lens 23 enters the second face 232 and imaging is performed at the position P2 at a distance S2 (corresponds to foregoing distance So) from the first face 231, in a range of 0<S1/S2≤50, the image generated at the position P2 by the divergent light emitted from the position P1 is represented as an image Im-1. Moreover, when parallel light (S1=∞) enters the second face 232, the image generated at the position P2 by the light beam emitted from the first face 231 is represented as an image Im-2. When the minimum value of the wavefront aberration of the image Im-1 is WF1 and the minimum value of the wavefront aberration of the image Im-2 is WF2, the diffractive structure has the function of satisfying the relationship of:

$$WF1<WF2 \quad (3).$$

Note that the foregoing relationship is a relationship that is satisfied upon adding the temperature characteristics of the semiconductor laser 22. Generally speaking, with a semiconductor laser, the emission wavelength changes when the temperature changes. Normally, the emission wavelength becomes longer as the temperature rises. When the emission wavelength changes, the refraction level based on the lens will change and the imaging point will shift. Moreover, the imaging position will also shift due to the thermal expansion of the collimator lens 23 and other lenses. Thus, the diffractive structure of this embodiment has the function of satisfying the relationship of foregoing Formula (3) in a temperature range of 0° C. to 60° C. and in a range of the emission wavelength of the semiconductor laser 22 which changes within the foregoing temperature range.

In addition, the diffractive structure of this embodiment also compensates the influence of the thermal deformation of the housing 104H of the optical scanning device 104. As described above, the housing 104H is molded from thermally expandable resin. From the perspective of cost reduction, the use of thermally expandable resin as the material for forming the housing 104H cannot be avoided. The housing 104H thermally expands when the ambient temperature increases, and the distance between the optical components retained in the housing 104H consequently increases. Specifically, this would be the distance between the laser unit 20 and the collimator lens 23, the distance between the laser unit 20 and the cylindrical lens 24, or the distance between the polygon mirror 26 and the fθ lens 28.

Thus, the characteristics of the semiconductor laser 22, the materials of the collimator lens 23 and the housing 104H, and the arrangement of the laser unit 20 and the collimator lens 23 in the housing 104H are determined based on the following conditions. In other words, when, at a temperature T, an emission wavelength of the semiconductor laser 22 is λ(T), a distance between the light-emitting face 20S of the laser unit 20 and the first face 231 of the collimator lens 23 is So(T), a distance between the second face 232 and the point P1 where imaging is performed by the light beam emitted from the laser unit 20 via the collimator lens 23 is Si(T), and a focal distance of the collimator lens 23 in the wavelength λ(T) is f(λ(T), T), and these are used as functions of temperature, and when a first temperature is T1, and a second temperature which is higher than the first temperature by a predetermined temperature is T2, the diffractive structure satisfies, in a temperature range of 0° C. to 60° C., relationships of the following Formula (4) and Formula (5):

$$f(\lambda(T1), T1)<f(\lambda(T2), T2) \quad (4)$$

$$Si(T1)>Si(T2) \quad (5).$$

As a result of satisfying foregoing Formula (4) and Formula (5), while the focal distance f of the collimator lens 23 represented with the function of the emission wavelength λ of the light source and the temperature T becomes longer at the second temperature T2 (high temperature), the distance Si from the second face 232 to the imaging point P1 becomes shorter at the second temperature T2. As a result of using the collimator lens 23 having the foregoing diffractive structure, even when the distance So between the light-emitting face 20S and the first face 231 of the collimator lens 23 increases due to the thermal expansion of the housing 104H, the temperature change of the imaging position can be inhibited as much as possible.

EXAMPLE 1

An example of construction data for realizing the collimator lens 23 according to the first embodiment explained above is now shown in Table 1 as Example 1. The collimator lens 23 of Example 1 includes a meniscus shape which is convex on the polygon mirror 26 side, the first face 231 and the second face 232 are both an aspheric surface, and a diffractive structure is provided to the second face 232. In Table 1, C represents an aspheric surface coefficient, and D represents a diffraction coefficient. The optical system of Example 1 is the optical system shown in FIG. 4 and FIG. 5 configured from the collimator lens 23 and the cover glass 20G shown in Table 1.

TABLE 1

Example 1

| | Entrance Face | Exit Face |
|---|---|---|
| R | −90.000 | −13.413 |
| k | −0.4143 | 1.1858 |
| C4 | −1.052E−07 | 1.962E−05 |
| C6 | 1.495E−07 | 1.880E−05 |
| C8 | 1.761E−08 | −1.626E−06 |
| C10 | 1.000E−09 | 4.937E−08 |
| λ | — | 788.0 |
| D2 | — | −1.635E−02 |
| D4 | — | 1.462E−05 |
| D6 | — | −8.457E−06 |
| D8 | — | 7.647E−07 |
| D10 | — | −2.248E−08 |

For comparison with foregoing Example 1, as shown in FIG. 6, construction data of the collimator lens designed so that the wavefront aberration becomes smallest when parallel light is caused to enter from the second face 232 is shown in Table 2 as a Comparative Example. The optical system of the Comparative Example is the optical system shown in FIG. 6 configured from the collimator lens 23 and the cover glass 20G shown in Table 2.

TABLE 2

Comparative Example

| | Entrance Face | Exit Face |
|---|---|---|
| R | −89.575 | −13.405 |
| k | 23.0229 | 1.4472 |
| C4 | −1.341E−05 | 3.233E−05 |
| C6 | 5.491E−06 | 1.886E−05 |
| C8 | −6.857E−07 | −1.651E−06 |
| C10 | 3.646E−08 | 5.220E−08 |
| λ | — | 788.0 |
| D2 | — | −1.635E−02 |
| D4 | — | 1.463E−05 |
| D6 | — | −8.417E−06 |
| D8 | — | 7.631E−07 |
| D10 | — | −2.235E−08 |

Figure 7:
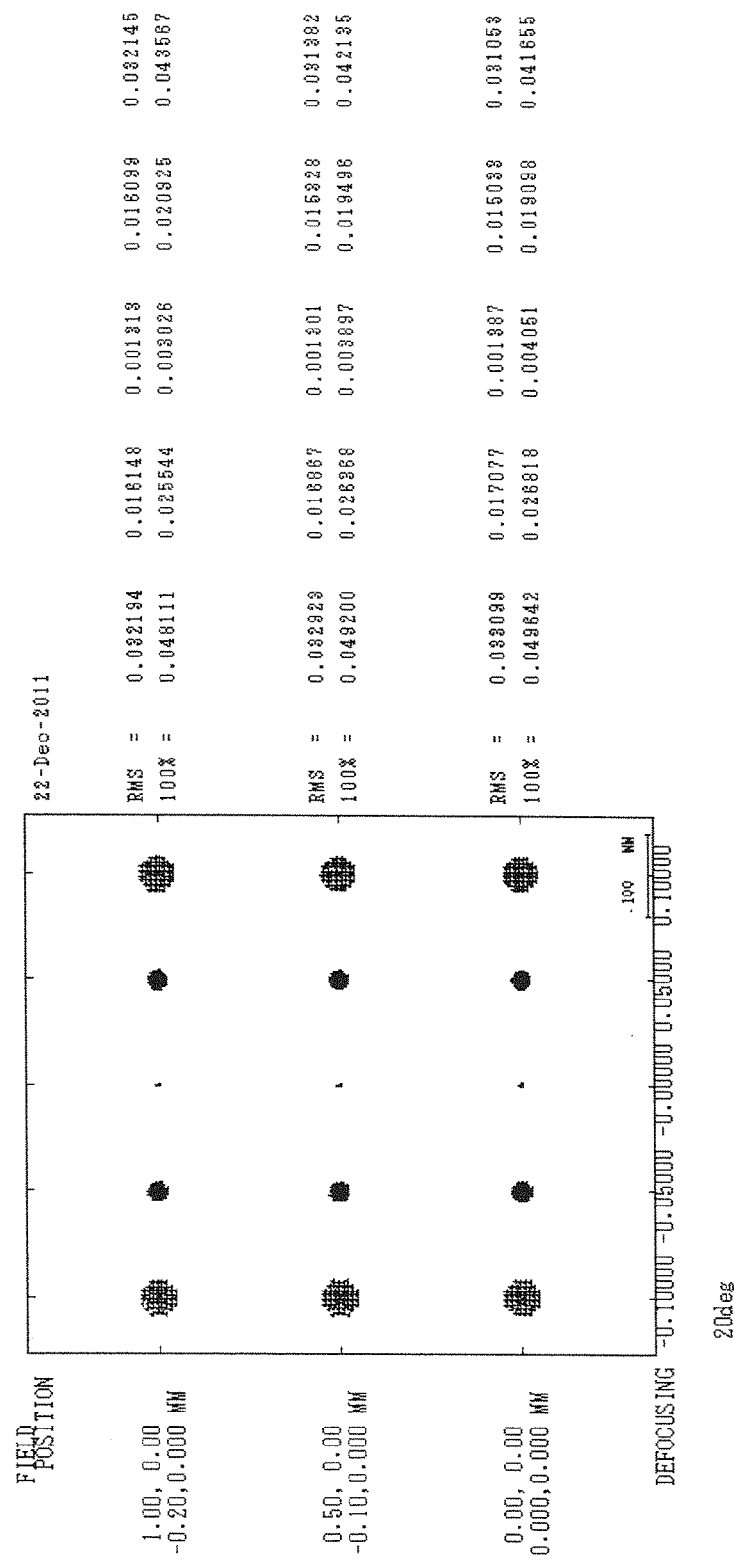
FIG. 7 is a graph showing the optical property (20° C.) of the collimator lens of Example 1.
Figure 8:
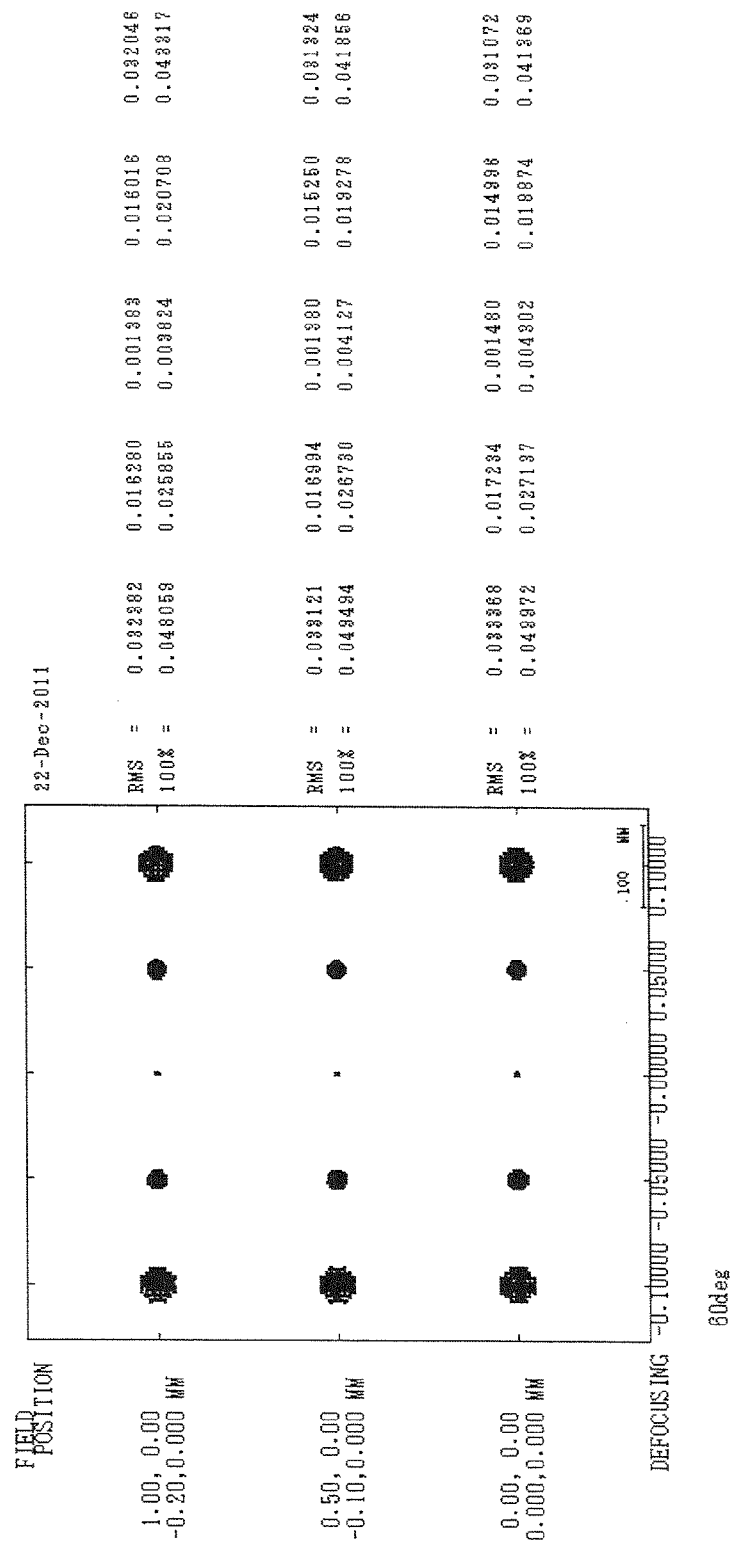
FIG. 8 is a graph showing the optical property (60° C.) of the collimator lens of Example 1.
Figure 9:
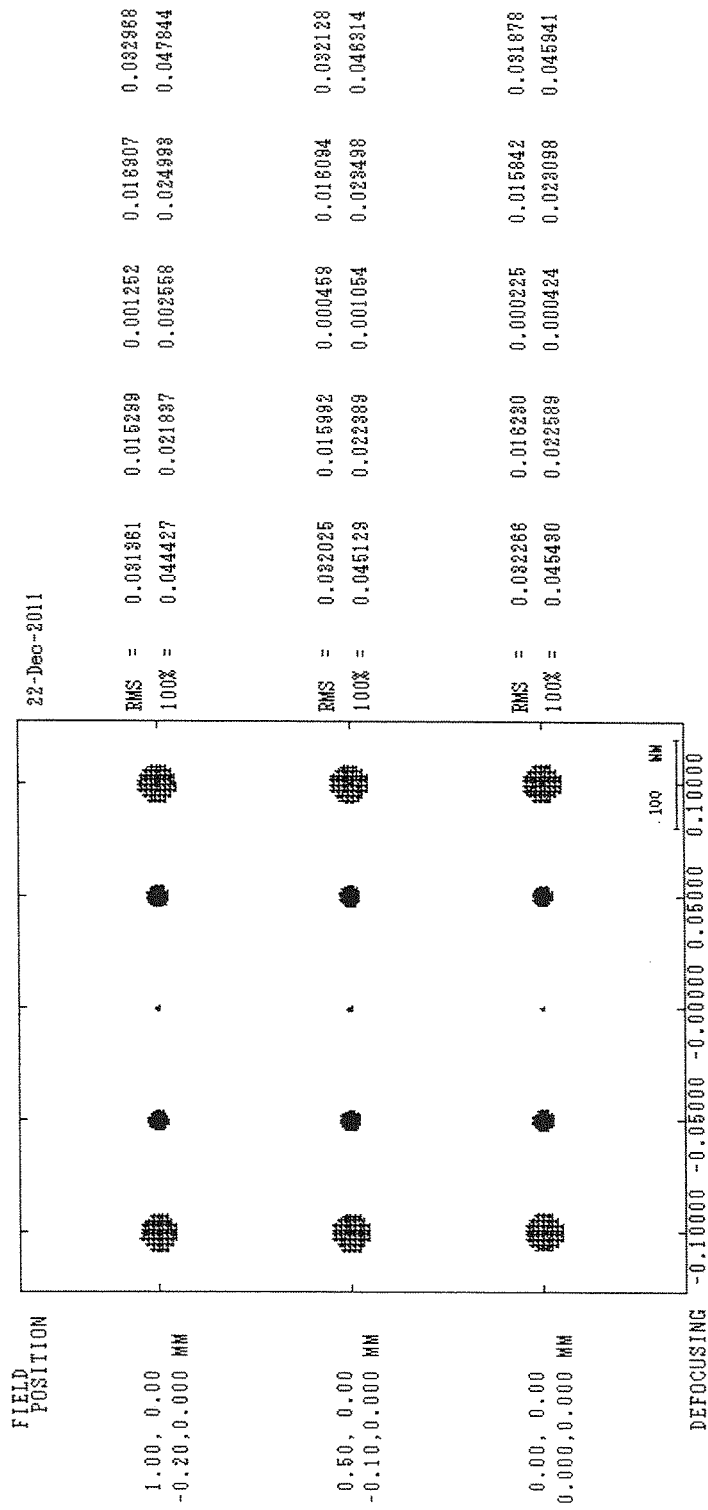
FIG. 9 is a graph showing the optical property (20° C.) of the collimator lens of the Comparative Example.
Figure 10:
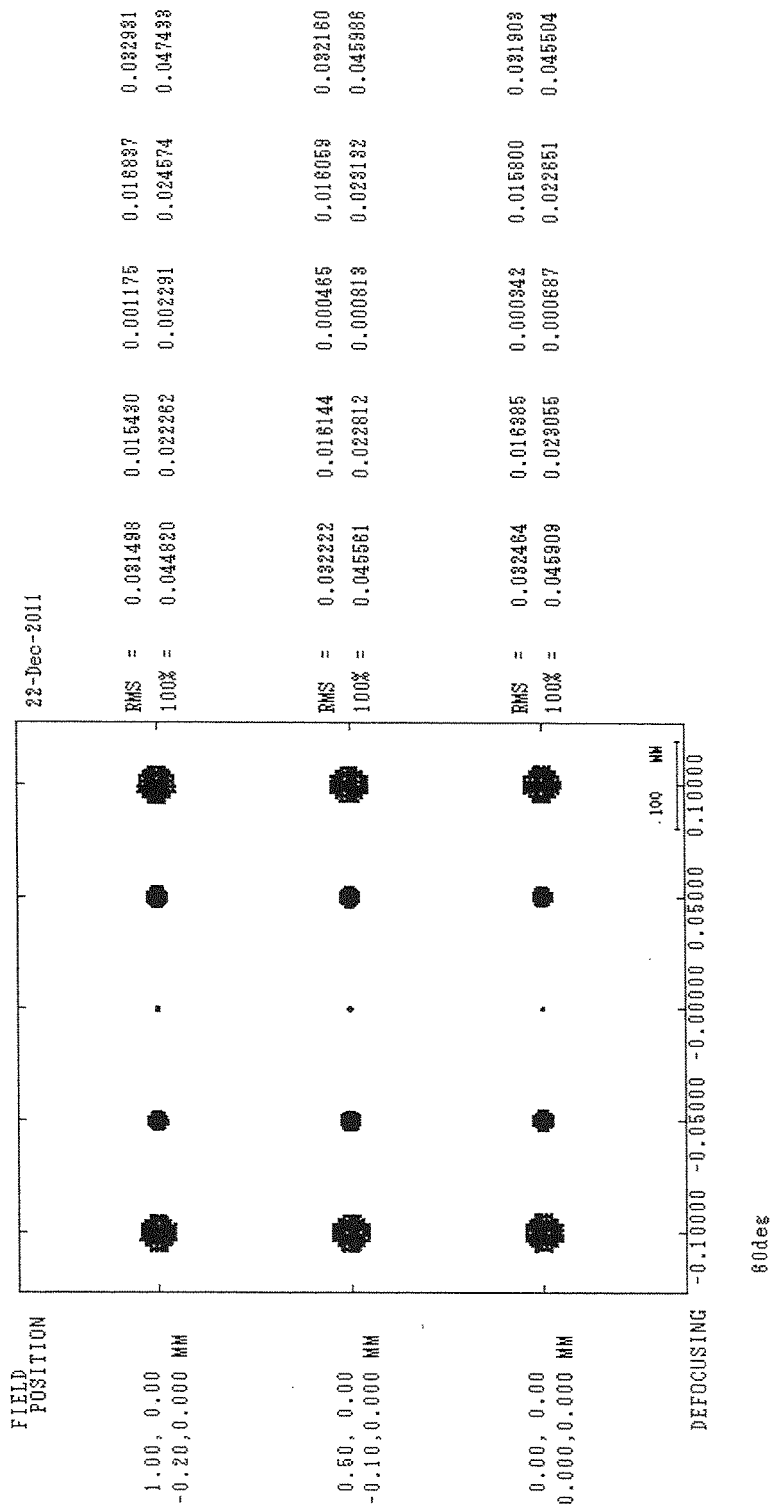
FIG. 10 is a graph showing the optical property (60° C.) of the collimator lens of the Comparative Example.

FIG. 7 and FIG. 8 show the spot diagram and the wavefront aberration of the image generated at the position P2 as the position of the light-emitting face 20S when parallel light enters from the second face 232 of the collimator lens 23 of Example 1. FIG. 7 shows a case when the ambient temperature is 20° C., and FIG. 8 shows a case when the ambient temperature is 60° C., respectively. Meanwhile, FIG. 9 and FIG. 10 show the spot diagram and the wavefront aberration of the image generated at the position of the light-emitting face 20S when parallel light enters from the second face 232 of the collimator lens 23 of the Comparative Example. FIG. 9 shows a case when the ambient temperature is 20° C., and FIG. 10 shows a case when the ambient temperature is 60° C., respectively.

Figure 11:
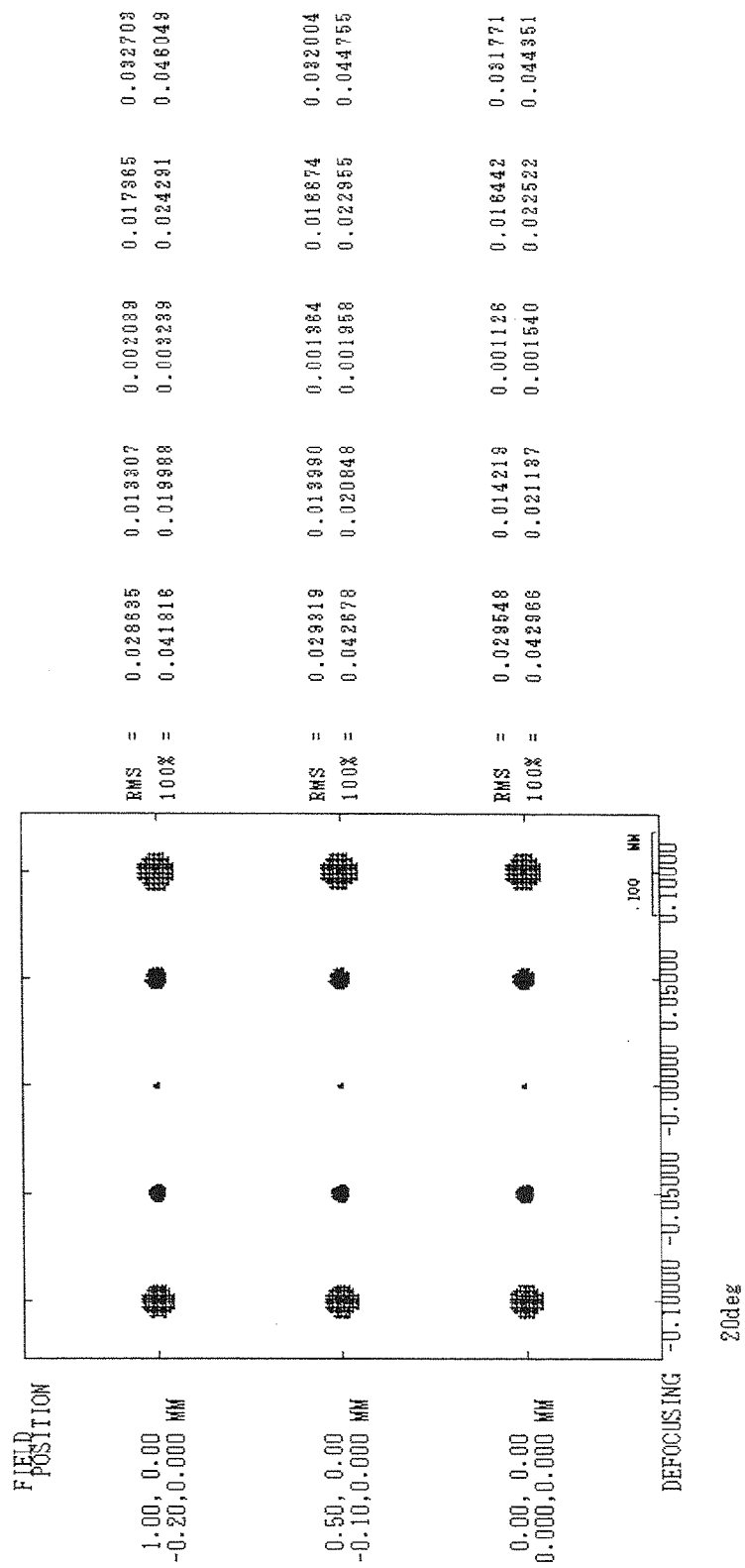
FIG. 11 is a graph showing the optical property (20° C.) of the collimator lens of Example 1.
Figure 12:
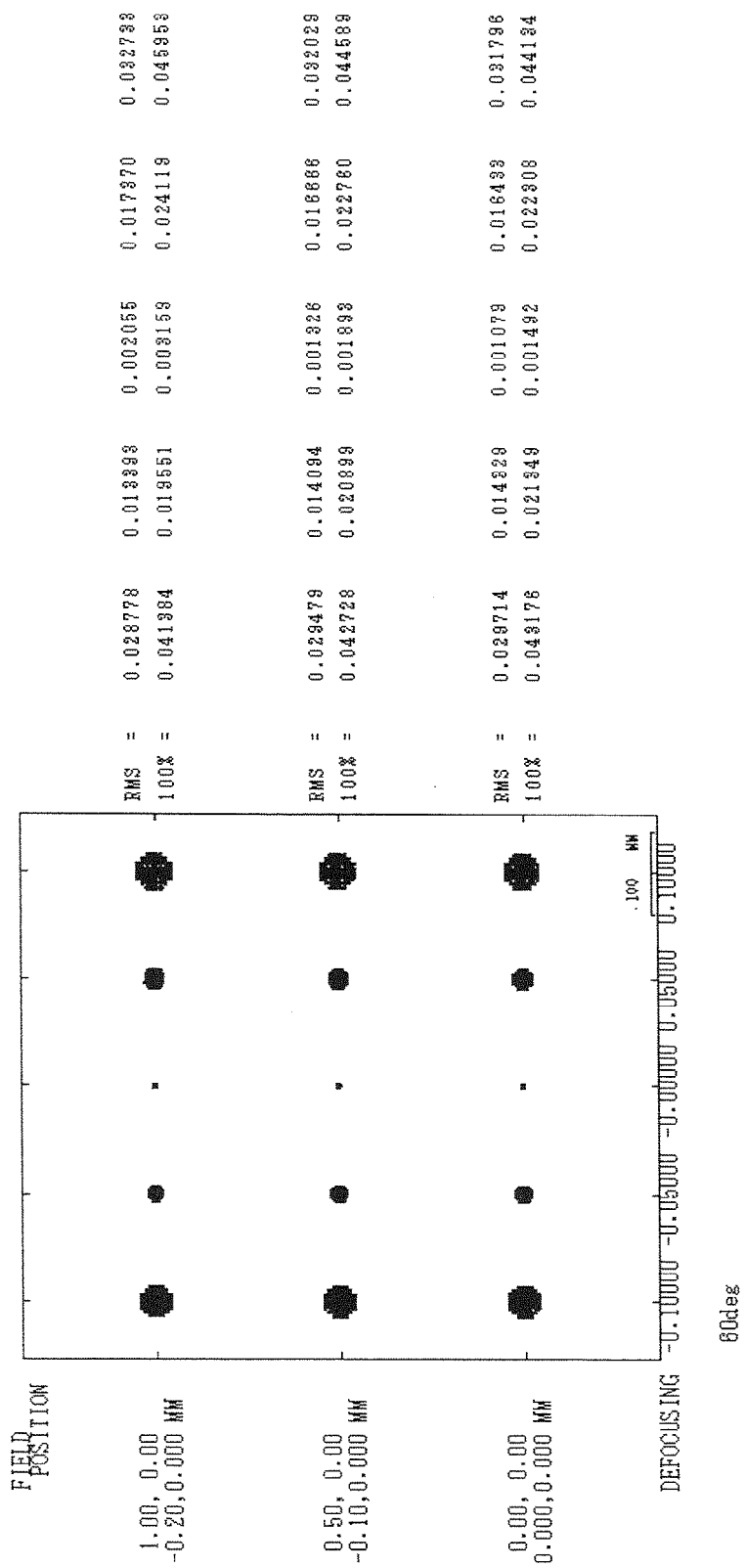
FIG. 12 is a graph showing the optical property (60° C.) of the collimator lens of Example 1.
Figure 13:
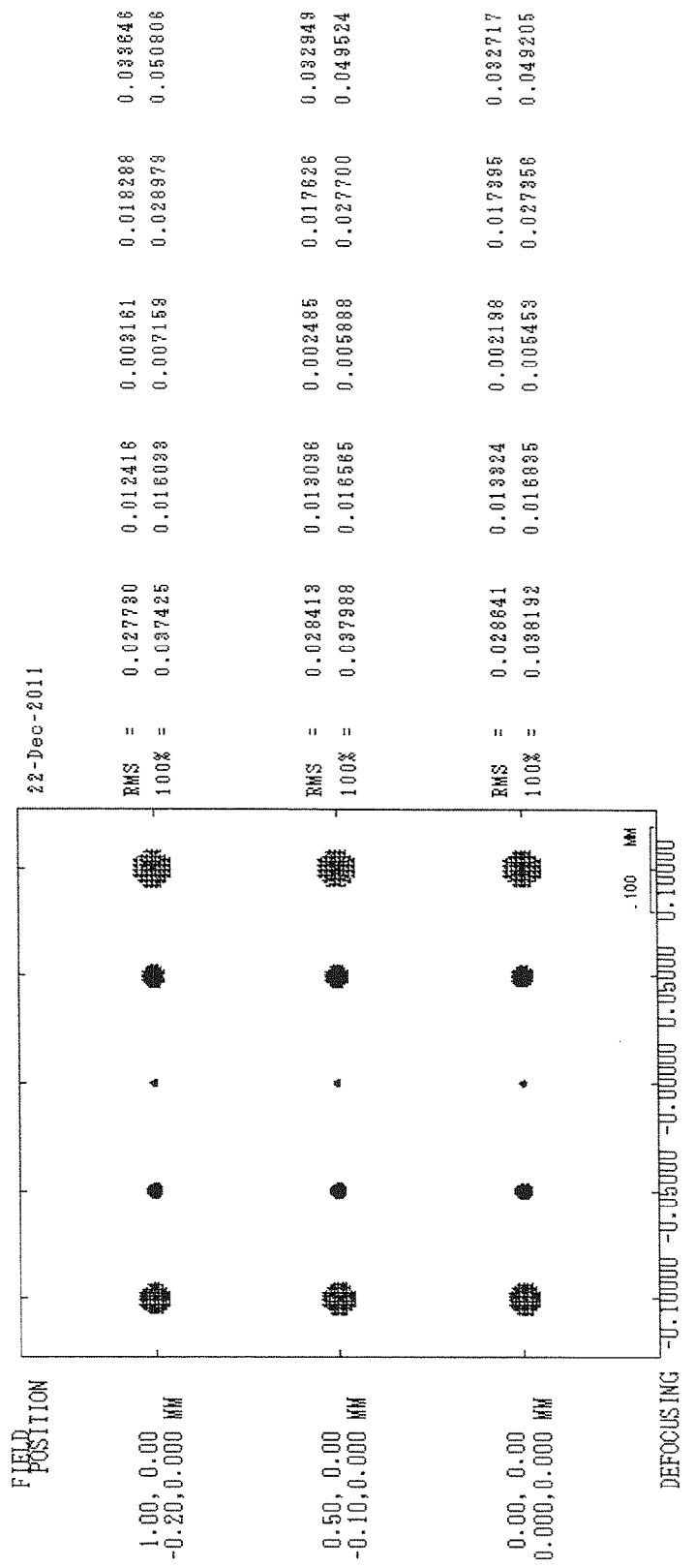
FIG. 13 is a graph showing the optical property (20° C.) of the collimator lens of the Comparative Example.
Figure 14:
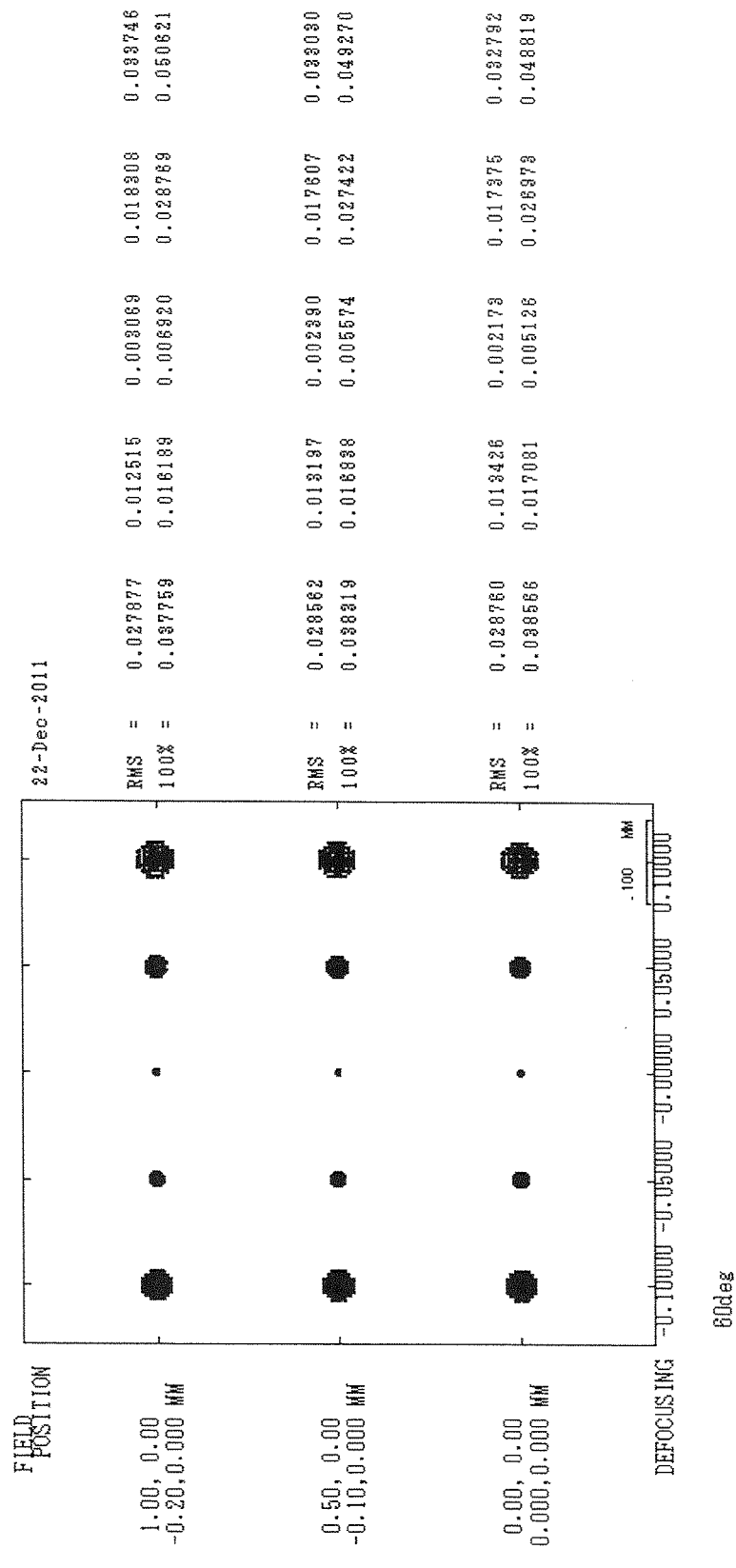
FIG. 14 is a graph showing the optical property (60° C.) of the collimator lens of the Comparative Example.

Moreover, FIG. 11 and FIG. 12 show the spot diagram and the wavefront aberration of the image generated at the position of the light-emitting face 20S when divergent light enters from the second face 232 of the collimator lens 23 of Example 1. FIG. 11 shows a case when the ambient temperature is 20° C., and FIG. 12 shows a case when the ambient temperature is 60° C., respectively. Meanwhile, FIG. 13 and FIG. 14 show the spot diagram and the wavefront aberration of the image generated at the position of the light-emitting face 20S when divergent light enters from the second face 232 of the collimator lens 23 of the Comparative Example. FIG. 13 shows a case when the ambient temperature is 20° C., and FIG. 14 shows a case when the ambient temperature is 60° C., respectively.

Note that each of the diagrams of FIG. 7 to FIG. 14 shows the spot diagram and the wavefront aberration in three rows; namely, an upper row, a middle row and a lower row. The upper row shows the spot diagram and the wavefront aberration when light is condensed at a position that is 0.2 mm off axis, the middle row shows the spot diagram and the wavefront aberration when light is condensed at a position that is 0.1 mm off axis, and the lower row shows the spot diagram and the wavefront aberration when light is condensed on the axis (the same applies in FIG. 15 to FIG. 18 described later).

In Example 1, a case where parallel light enters and a case where divergent light enters are compared. In other words, when data of FIG. 7 and FIG. 8 and data of FIG. 11 and FIG. 12 are compared and, for example, the value of wavefront aberration 100% on the axis is viewed, while FIG. 7 and FIG. 8 in the case of parallel light are 0.004051 (20° C.) and 0.004302 (60° C.), FIG. 11 and FIG. 12 in the case of divergent light are 0.001540 (20° C.) and 0.001492 (60° C.). As evident from this comparison, the wavefront aberration is smaller in the case where divergent light enters in both cases.

Meanwhile, in the Comparative Example, when data of FIG. 9 and FIG. 10 and data of FIG. 13 and FIG. 14 are compared and, for example, the value of wavefront aberration 100% on the axis is viewed, while FIG. 9 and FIG. 10 in the case of parallel light are 0.000424 (20° C.) and 0.000687 (60° C.), FIG. 13 and FIG. 14 in the case of divergent light are 0.005453 (20° C.) and 0.005126 (60° C.) Accordingly, in the Comparative Example, the wavefront aberration is greater in the case where divergent light enters in both cases.

Figure 15:
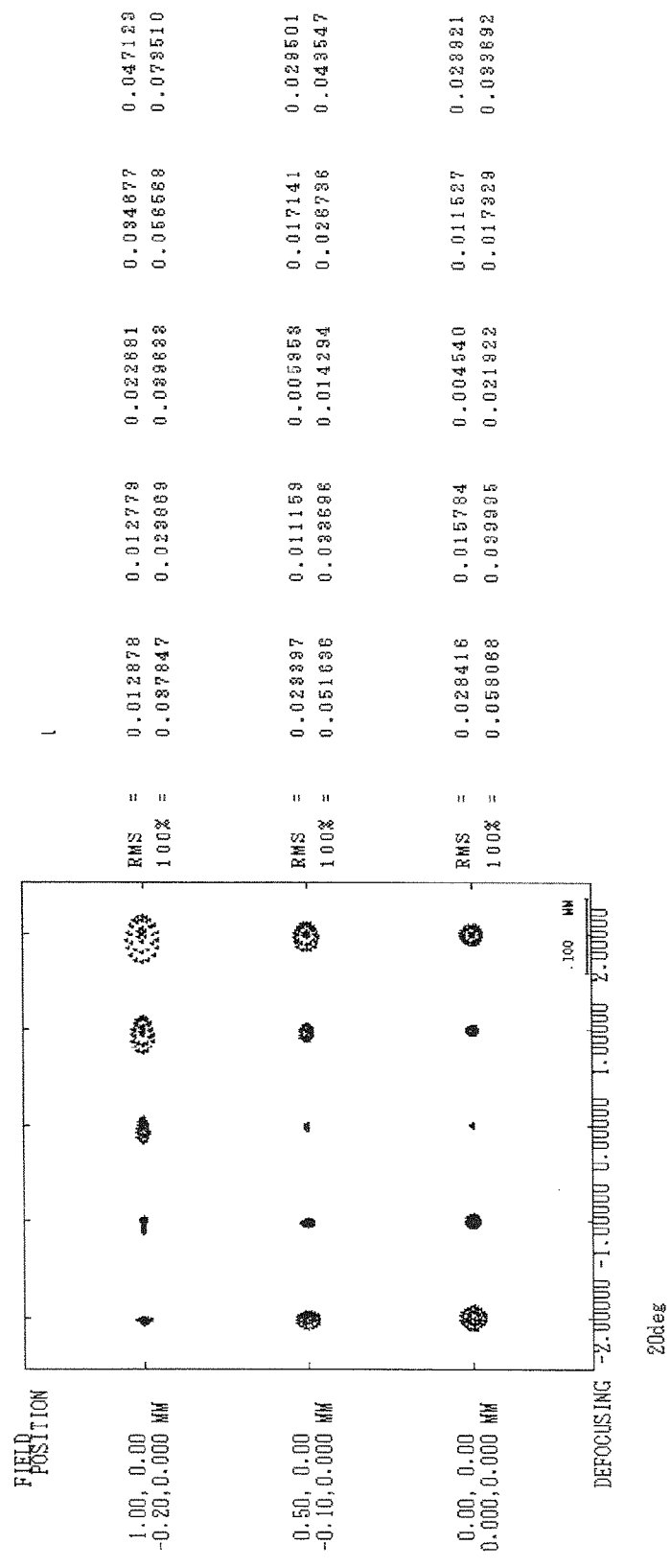
FIG. 15 is a graph showing the optical property (20° C.), at the focal point, of the collimator lens of Example 1.
Figure 16:
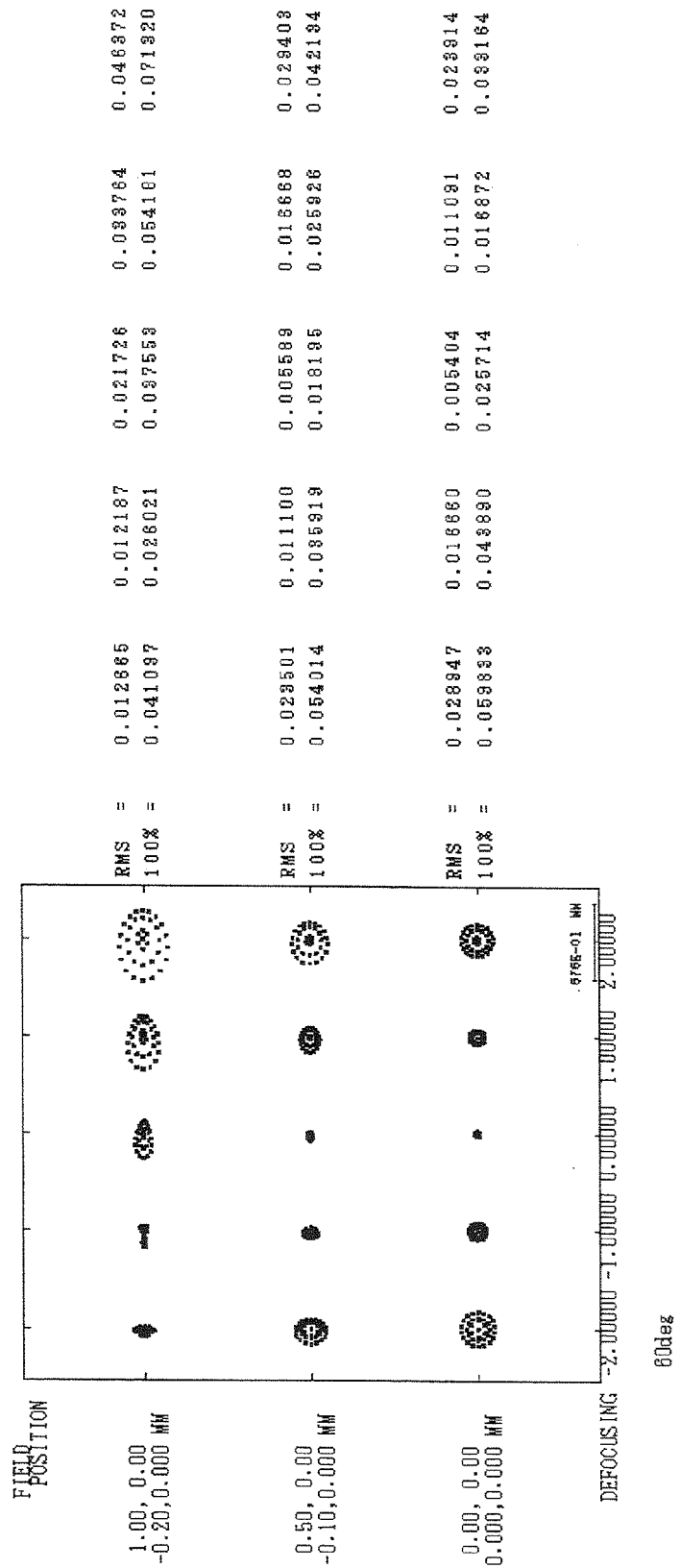
FIG. 16 is a graph showing the optical property (60° C.), at the focal point, of the collimator lens of Example 1.

Next, FIG. 15 and FIG. 16 show the spot diagram and the wavefront aberration of an image in a case where the collimator lens 23 of foregoing Example 1 is used to emit light from the laser unit 20 at the position P2 and divergent light is caused to enter the collimator lens 23 (through the cover glass 20G) as shown in FIG. 4, and imaging is performed at the position P1 as the focal point. FIG. 15 shows a case when the ambient temperature is 20° C., and FIG. 16 shows a case when the ambient temperature is 60° C., respectively.

Figure 17:
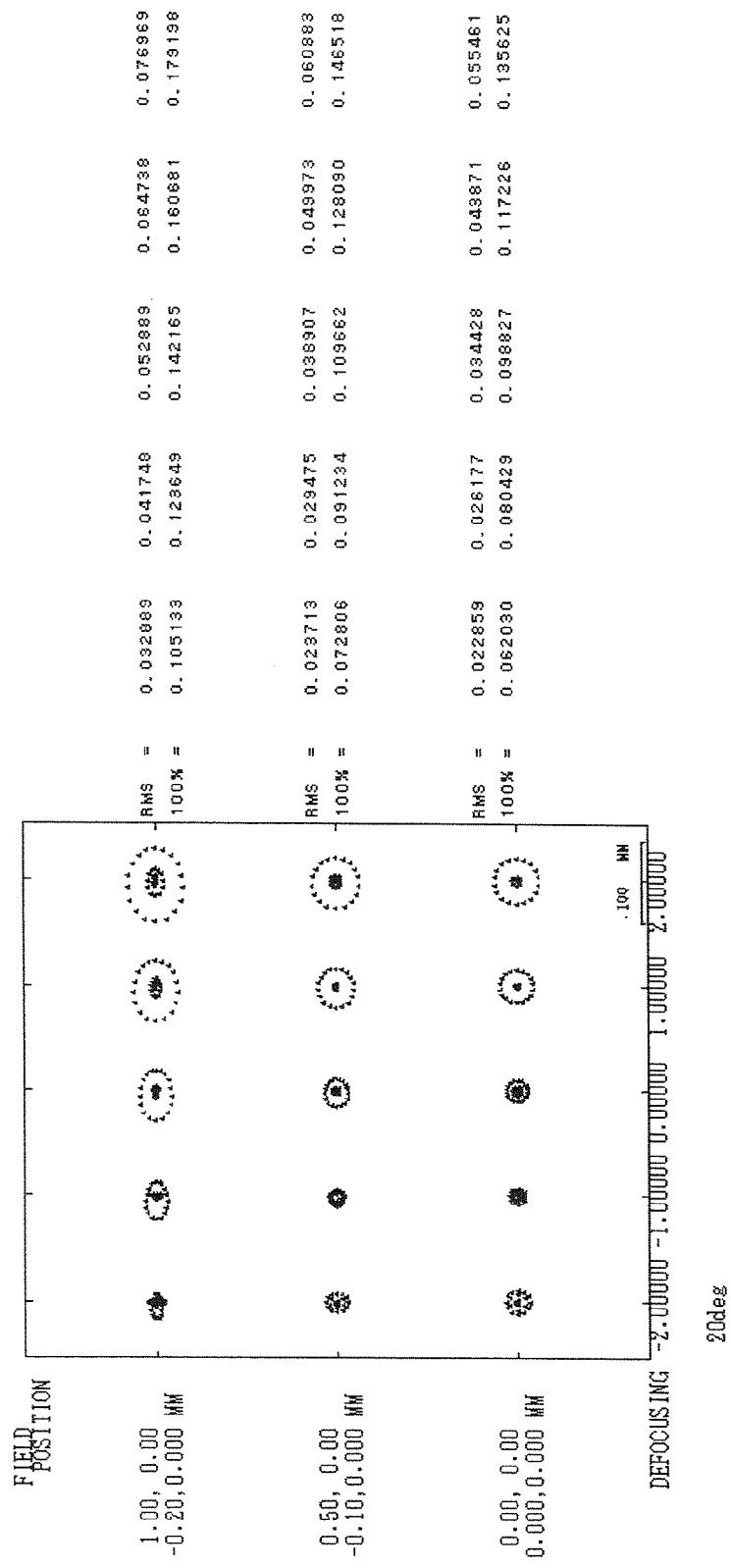
FIG. 17 is a graph showing the optical property (20° C.), at the focal point, of the collimator lens of the Comparative Example.
Figure 18:
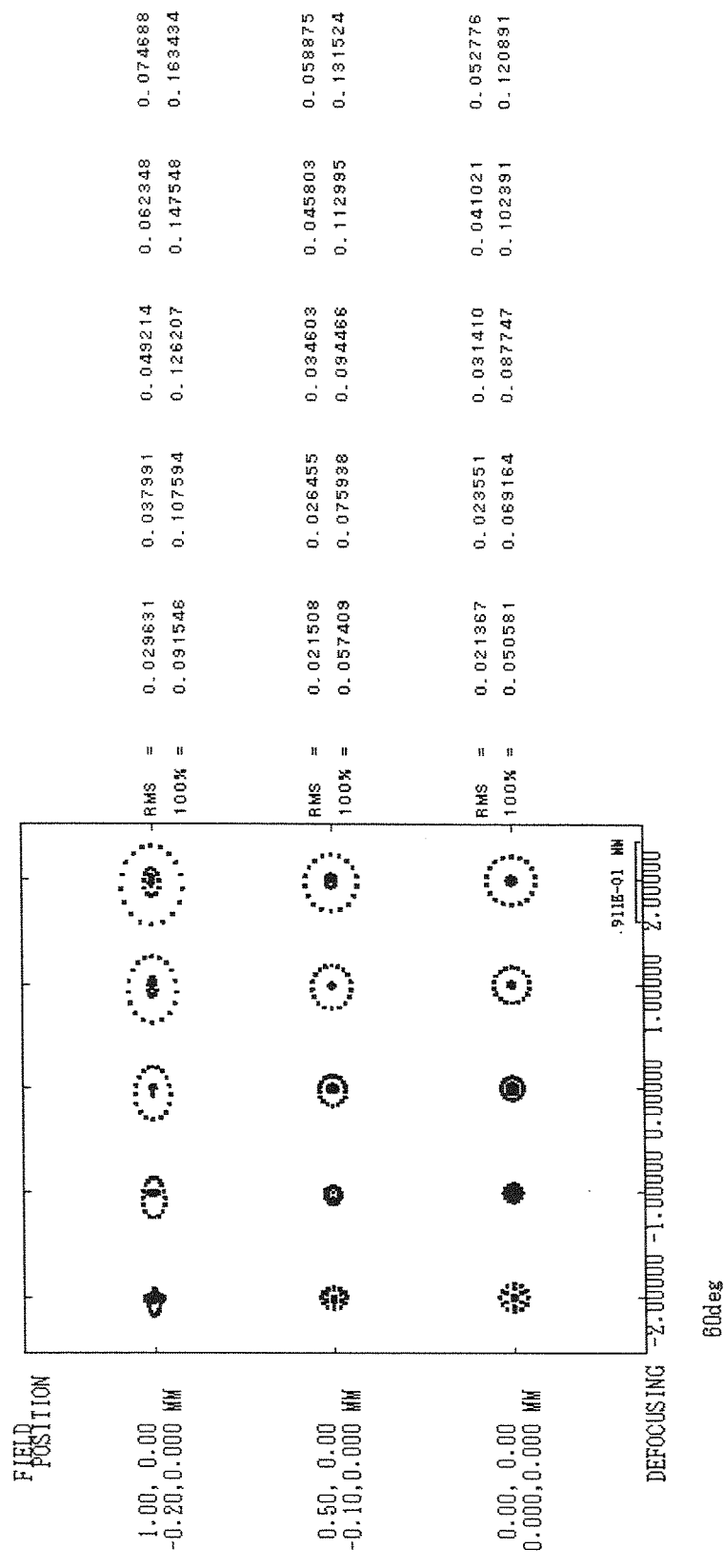
FIG. 18 is a graph showing the optical property (60° C.), at the focal point, of the collimator lens of the Comparative Example.

Meanwhile, FIG. 17 and FIG. 18 show the spot diagram and the wavefront aberration of an image in a case where the collimator lens 23 of the foregoing Comparative Example 1 is used to similarly emit light from the laser unit 20 and divergent light is caused to enter the collimator lens 23 (through the cover glass 20G), and imaging is performed at the position P1 as the focal point. FIG. 17 shows a case when the ambient temperature is 20° C., and FIG. 18 shows a case when the ambient temperature is 60° C., respectively.

As evident from the comparison of Example 1 and the Comparative Example in FIG. 15 to FIG. 18, it can be understood that Example 1 is superior in both a beam condensed state and wavefront aberration.

Table 3 shows the emission wavelength of the semiconductor laser 22 and the temperature characteristics of the refractive index of the collimator lens 23 and the cover glass 20G used in foregoing Example 1 and the Comparative Example. Moreover, Table 4 shows the temperature characteristics between the respective faces in the optical system of Example 1.

TABLE 3

Temperature Characteristics of Wavelength and Refractive Index

| | Temperature | |
|---|---|---|
| | 20 deg | 60 deg |
| Wavelength (nm) | 788.0 | 797.2 |
| Lens | 1.5242 | 1.5206 |
| Cover Glass | 1.5107 | 1.5109 |

TABLE 4

Temperature Characteristics between Respective Faces

| | (mm) | | |
|---|---|---|---|
| | 20 deg | 60 deg | Variation |
| LD-Cover Glass | 0.500 | 0.501 | 1.0017 |
| Cover Glass Thickness | 0.250 | 0.250 | 1.0003 |
| Cover Glass-Entrance Face | 13.132 | 13.152 | 1.0015 |
| Lens Thickness | 2.600 | 2.606 | 1.0024 |
| Lens-Focal Point | 384.176 | 380.159 | |
| Lens Focal Distance | 15.000 | 15.019 | |

As shown in Table 4, with the collimator lens 23 of Example 1, the focal distance thereof is longer in the case of 60° C. than 20° C. (15.000 mm→15.019 mm). However, based on the function of the diffractive structure, the distance from the second face 232 of the collimator lens 23 to the position P2 of the focal point is shorter in the case of a high temperature. The advantage of this point will be explained in the second embodiment described below. Note that the change in the shape and the change in the diffraction efficiency of the collimator lens 23 caused by the temperature change have been incorporated into the calculation according to the change rate indicated with the lens thickness of Table 4.

<Second Embodiment of Optical Scanning Device>

The optical scanning device according to the second embodiment is now explained. The internal structure and optical arrangement of the optical scanning device of the second embodiment are the same as the optical scanning device 104 explained in the first embodiment. In the second embodiment, explained is an embodiment where the imaging position will not shift even when there is a change in the arrangement spacing between the respective optical members caused by the thermal expansion of the housing 104H of the optical scanning device 104.

Figure 19:
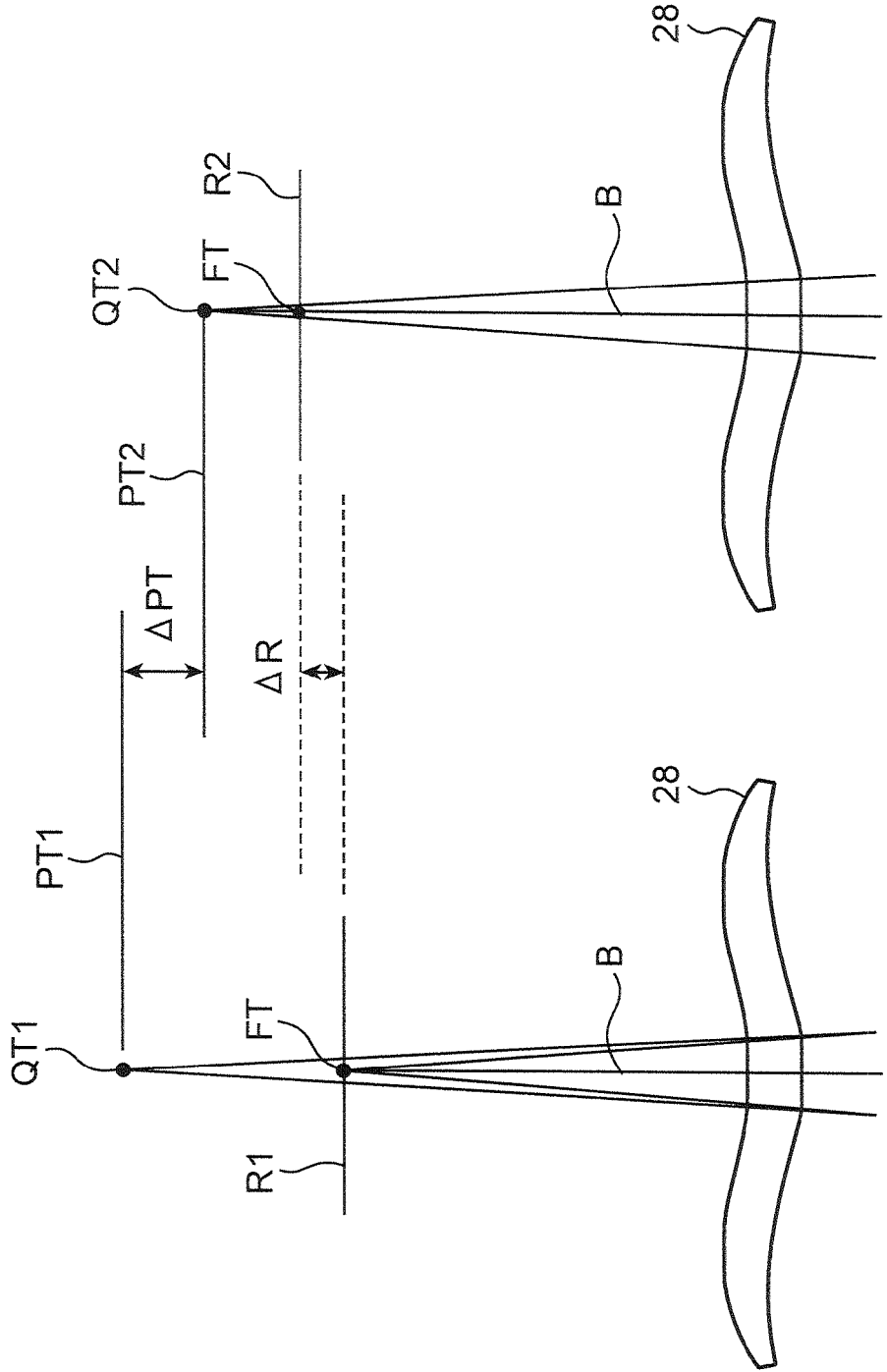
FIGS. 19A and 19B are diagrams showing the temperature-based optical system of the optical scanning device of embodiment 2.

When the temperature of the environment in which the optical scanning device 104 is disposed increases, the refractive index of the collimator lens 23, the cylindrical lens 24 and the fθ lens 28 will increase, and, when these lenses are molded from a resin material, the lens shape will also change based on thermal expansion. Moreover, the emission wavelength of the semiconductor laser 22 becomes longer. These phenomena work in a direction of increasing the focal distance. FIG. 19A shows the state of a light path at a relatively low temperature of the temperature T1 in the light path heading toward the center of the surface to be scanned in the main scanning direction, and FIG. 19B shows the state of the light path in a state of a relatively high temperature that is higher than the temperature T1 by ΔT. As shown in these diagrams, the imaging point FT of the laser beam B becomes longer based on the imaging optical system provided to the optical scanning device 104.

The housing 104H molded from thermally expandable resin will naturally expand when the temperature of the environment in which the optical scanning device 104 is disposed increases. The collimator lens 23 and the optical members configuring the optical scanning device 104 are supported by the housing 104H. Accordingly, the arrangement spacing between the respective optical members will expand pursuant to the increase in the ambient temperature. For example, the position of the surface to be scanned (peripheral surface 103S of the photoreceptor drum 103) shown with a symbol R1 in FIG. 19A extends by ΔR up to the position shown with a symbol R2 of FIG. 19B due to the temperature increase, and the surface to be scanned will consequently recede from the fθ lens 28.

In FIG. 19A, a symbol PT1 shows the conjugate point on the side of the surface to be scanned of the fθ lens 28. The conjugate point PT1 will approach the fθ lens 28 by ΔPT as shown with a symbol PT2 of FIG. 19B as a result of the focal distance of the foregoing imaging optical system becoming longer and the surface to be scanned receding from the fθ lens 28. Unless consideration is given to this kind of thermal influence, the laser beam B cannot be focused on the surface to be scanned.

In the second embodiment, the thermal influence is compensated by the diffractive structure provided to the collimator lens 23. In FIG. 19A, a symbol QT1 shows the convergent point where the convergent light generated by the single collimator lens 23 converges on the side of the surface to be scanned. With a collimator lens that does not have a diffractive structure, the distance (focal distance of the collimator lens) to the convergent point QT1 will increase pursuant to the temperature increase. However, in this embodiment, as shown with a symbol QT2 of FIG. 19B, the convergent point is set to approach the fθ lens 28 based on the diffractive structure.

In addition, based on the diffractive structure, the convergent point QT1 and the conjugate point PT1 are set to coincide at the temperature T1 of FIG. 19A, and the convergent point QT2 and the conjugate point PT2 are also set to coincide at the temperature T2 of FIG. 19B. Here, T1 and T2 are, for example, 0° C. and 60° C. as the upper limit and the lower limit of the practical operating temperature of the optical scanning device 104. In other words, in the temperature range of 0° C. to 60° C., the diffractive structure of the collimator lens 23 is set so that the conjugate point PT of the fθ lens 28 in the main scanning direction and the convergent point QT of the single collimator lens 23 will constantly coincide.

When the position of the surface to be scanned, which is the surface to be imaged, is determined, the conjugate point PT of the fθ lens 28 in the main scanning direction will be determined uniformly. The surface to be scanned will shift from the position R1 to the position R2 based on the temperature increase. In order to focus the imaging point FT at the position R2, the change ΔPT of the conjugate point PT of the fθ lens 28 in the main scanning direction should be coincided with the positional variation from the convergent point QT1 to the convergent point QT2 of the single collimator lens 23. Specifically, when the diffractive structure of the collimator lens 23 having predetermined characteristics in the emission wavelength λ(T) of the semiconductor laser 22 is set in advance, the lens surface of the fθ lens 28 may be set so that the position of the conjugate point PT matches the temperature change QT(T) of the convergent point QT.

EXAMPLE 2

An example of the construction data which realizes the optical system according to the second embodiment described above is shown in Table 5 as Example 2. In Table 5, only the construction data of the fθ lens 28 (scanning lens) is shown. The collimator lens 23 is the same as the one used in Example 1 (refer to Table 1 for the construction data). Table 6 shows the temperature characteristics of the refractive index of the cylindrical lens 24 and the fθ lens 28. Moreover, Table 7 shows the temperature characteristics between the respective faces in the optical system of Example 2. Note that the temperature characteristics of the refractive index of the collimator lens 23 and the cover glass 20G are the same as Table 3, and the temperature characteristics between the faces that are not shown in Table 7 are as per Table 4.

TABLE 5

Main Scanning Cross Section Shape of Scanning Lens

|    | Entrance Face | Exit Face  |
|----|---------------|------------|
| R  | 22.114        | 21.537     |
| k  | −7.265        | −6.818     |
| C1 | 0             | 2.809E−03  |
| C2 | −1.949E−03    | −3.945E−03 |
| C3 | 0             | −2.384E−06 |
| C4 | −2.015E−06    | −1.660E−06 |
| C5 | 0             | 4.639E−10  |
| C6 | 4.123E−10     | 9.578E−11  |
| C7 | 0             | 0          |
| C8 | −3.186E−14    | −4.537E−14 |

TABLE 6

Change of Refractive Index

|                  | 20 deg | 60 deg |
|------------------|--------|--------|
| Cylindrical Lens | 1.5106 | 1.5108 |
| Scanning Lens    | 1.5050 | 1.5010 |

TABLE 7

Change between Respective Faces

|                                | 20 deg | 60 deg | Variation |
|--------------------------------|--------|--------|-----------|
| Collimator Lens-Cylindrical Lens | 19.093 | 19.122 | 1.0015 |
| Cylindrical Lens Thickness       | 3.000  | 3.007  | 1.0024 |
| Cylindrical Lens-Deflector       | 40.950 | 41.012 | 1.0015 |
| Deflector-Scanning Lens          | 23.710 | 23.746 | 1.0015 |
| Scanning Lens Thickness          | 9.000  | 9.032  | 1.0036 |
| Scanning Lens-Photoreceptor Drum | 110.090 | 110.257 | 1.0015 |

Figure 20:
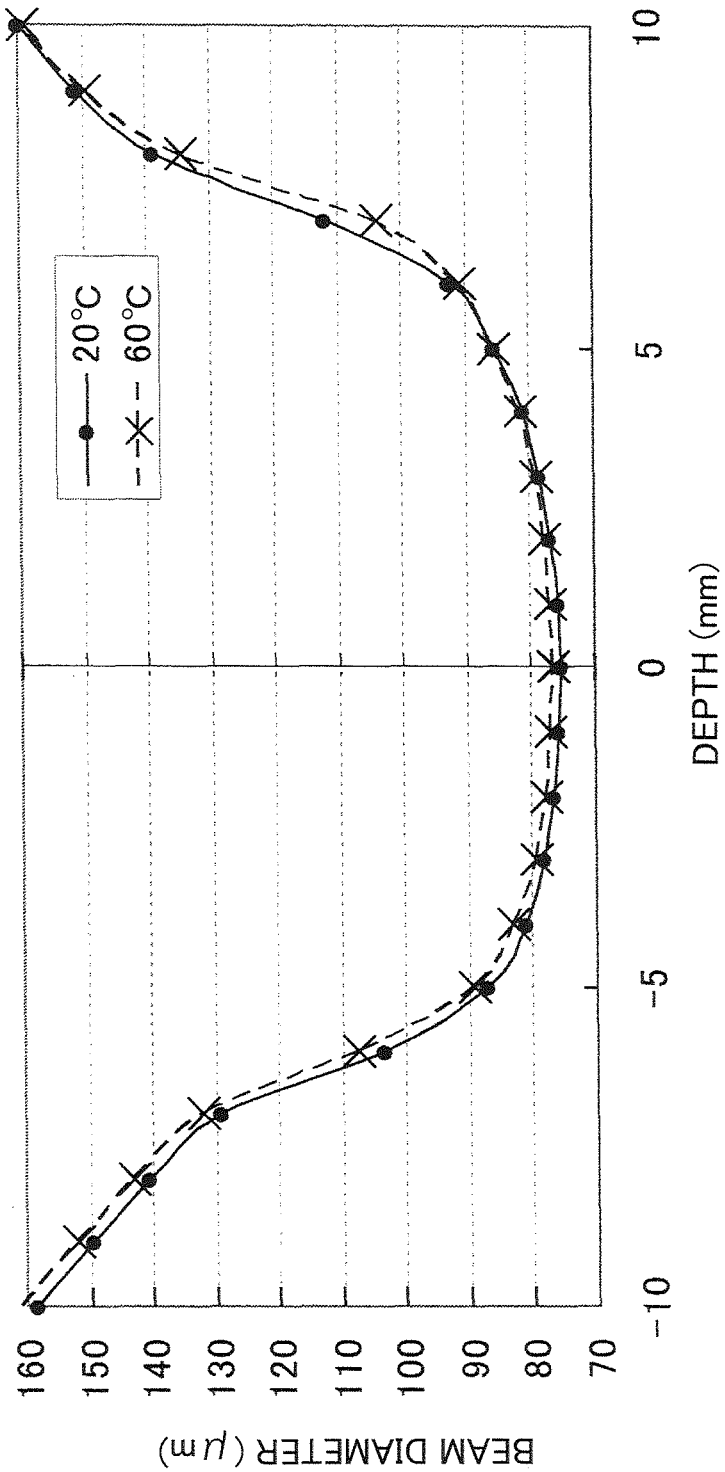
FIG. 20 is a graph showing the optical property of the optical scanning device of embodiment 2.

FIG. 20 is a graph showing the temperature-based depth characteristics of the beam diameter of the optical system of Example 2 in the main scanning direction when the ambient temperature=20° C., 60° C. In FIG. 20, the point of depth=0 mm is the peripheral surface 103S (surface to be scanned) of the photoreceptor drum 103. As evident from FIG. 20, according to the optical system of Example 2, it can be seen that there is hardly any difference in the focus position in the case of 20° C. and the case of 60° C. In other words, it can be seen that the temperature compensation can be favorably performed based on the diffractive structure of the collimator lens 23.

According to the optical scanning device 104 of this embodiment explained above, since the collimator lens 23 generates convergent light and also includes a diffractive structure which satisfies foregoing Formula (3), it is possible to downsize the optical scanning device 104 and at the same time favorably maintain the imaging performance even when the ambient temperature changes. Moreover, in addition to foregoing Formula (3), by additionally satisfying foregoing Formula (4) and Formula (5), the imaging performance can be favorably compensated by adding the influence of the thermal expansion of the housing.

Embodiments of the present disclosure were explained above, but the present disclosure is not limited thereto. For example, the foregoing embodiments explained a case of applying the collimator lens 23 to a scanning optical system that is provided to the optical scanning device 104 of the printer 1. Without limitation to the foregoing usage, for example, the collimator lens 23 may also be applied to an optical pickup system of a CD player or a DVD player, or an optical system provided to a laser pointer.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A collimator lens which converts, into convergent light, a light beam of divergent light emitted from a light source in which an emission wavelength changes according to temperature, comprising:
    a first face which faces the light source on a light path and on which the light beam is incident;
    a second face which is placed opposite to the first face and from which the light beam exits; and
    a diffractive structure which is formed on at least one of the first face and the second face; wherein
    in a case where divergent light emitted from a position P1 at a distance S1 from the second face enters the second face and imaging is performed at a position P2 at a distance S2 from the first face, in a temperature range of 0° C. to 60° C. and in a range of the emission wavelength of the light source which changes within the temperature range, and when a minimum value of a wavefront aberration of an image, which is generated at the position P2 by the divergent light emitted from the position P1 in a range of 0<S1/S2≤50, is WF1, and when a minimum value of a wavefront aberration of an image, which is generated at the position P2 when parallel light satisfying S1=∞ enters the second face, is WF2, a relationship of WF1<WF2 is satisfied.

2. An optical scanning device, comprising:

a light source which emits a light beam;

a collimator lens which converts a light beam emitted from the light source into convergent light;

a deflector which includes a reflecting surface for reflecting the light beam emitted from the light source, and deflects/scans the light beam;

a cylindrical lens which converts the convergent light into linear light and images the linear light on the reflecting surface of the deflector; and a scanning lens which images, on a surface to be scanned, the light beam that has been deflected/scanned by the deflector; wherein the light source emits divergent light and an emission wavelength thereof changes according to temperature, the collimator lens includes a first face which faces the light source on a light path, a second face which faces the deflector, and a diffractive structure formed on at least one of the first face and the second face, and in a case where divergent light emitted from a position P1 at a distance S1 from the second face enters the second face and imaging is performed at a position P2 at a distance S2 from the first face by the single collimator lens, in a temperature range of 0° C. to 60° C. and in a range of the emission wavelength of the light source which changes within the temperature range, and when a minimum value of a wavefront aberration of an image, which is generated at the position P2 by the divergent light emitted from the position P1 in a range of 0<S1/S2≤50, is WF1, and when a minimum value of a wavefront aberration of an image, which is generated at the position P2 when parallel light satisfying S1=∞ enters the second face, is WF2, a relationship of WF1<WF2 is satisfied.

3. The optical scanning device according to claim 2, further comprising:

a housing which is molded from thermally expandable resin and supports the light source, the collimator lens, the cylindrical lens, the deflector and the scanning lens; wherein when, at a temperature T, an emission wavelength of the light source is $\lambda(T)$, a distance between a light-emitting face of the light source and the first face is So(T), a distance between the second face and a point where imaging is performed by the light beam emitted from the light source via the collimator lens is Si(T), and a focal distance of the collimator lens in the wavelength $\lambda(T)$ is $f(\lambda(T), T)$, and these are used as functions of temperature, and when a first temperature is T1, and a second temperature which is higher than the first temperature by a predetermined temperature is T2, the diffractive structure satisfies, in a temperature range of 0° C. to 60° C., relationships of:

$f(\lambda(T1), T1) < f(\lambda(T2), T2)$; and $Si(T1) > Si(T2)$.

4. The optical scanning device according to claim 2, wherein the first face of the collimator lens has negative optical power.

5. The optical scanning device according to claim 2, wherein when, at a temperature T, an emission wavelength of the light source is $\lambda(T)$ and is treated as a function of temperature, a conjugate point PT of the scanning lens on a side of the surface to be scanned at the temperature T and the emission wavelength $\lambda(T)$, and a convergent point QT where the convergent light generated by the single collimator lens converges on a side of the surface to be scanned, are of a same position in a temperature range of 0° C. to 60° C. on a light path heading toward a center of the surface to be scanned in a main scanning direction.

6. The optical scanning device according to claim 2, wherein the light source is a laser diode.

7. The optical scanning device according to claim 2, wherein the scanning lens is configured from one scanning lens.

8. An image forming apparatus, comprising:

an image carrier which carriers an electrostatic latent image; and the optical scanning device which irradiates a peripheral face of the image carrier as the surface to be scanned with a light beam;

wherein the optical scanning device includes:

a light source which emits a light beam;

a collimator lens which converts a light beam emitted from the light source into convergent light;

a deflector which includes a reflecting surface for reflecting the light beam emitted from the light source, and deflects/scans the light beam;

a cylindrical lens which converts the convergent light into linear light and images the linear light on the reflecting surface of the deflector; and a scanning lens which images, on a surface to be scanned, the light beam that has been deflected/scanned by the deflector; wherein the light source emits divergent light and an emission wavelength thereof changes according to temperature, the collimator lens includes a first face which faces the light source on a light path, a second face which faces the deflector, and a diffractive structure formed on at least one of the first face and the second face, and in a case where divergent light emitted from a position P1 at a distance S1 from the second face enters the second face and imaging is performed at a position P2 at a distance S2 from the first face by the single collimator lens, in a temperature range of 0° C. to 60° C. and in a range of the emission wavelength of the light source which changes within the temperature range, and when a minimum value of a wavefront aberration of an image, which is generated at the position P2 by the divergent light emitted from the position P1 in a range of 0<S1/S2≤50, is WF1, and when a minimum value of a wavefront aberration of an image, which is generated at the position P2 when parallel light satisfying S1=∞ enters the second face, is WF2, a relationship of WF1<WF2 is satisfied.

* * * * *